(12) United States Patent
Carter et al.

(10) Patent No.: US 12,503,905 B2
(45) Date of Patent: Dec. 23, 2025

(54) SYSTEMS AND DEVICES FOR FACILITATING SECURE ITEM RETRIEVAL

(71) Applicant: WhatzPoppin, Inc., Ponte Vedra Beach, FL (US)

(72) Inventors: William Christian Carter, Jacksonville, FL (US); Dakota Michael Peel, Ponte Vedra, FL (US); Sarita Marie Mullin, Ponte Vedra Beach, FL (US)

( * ) Notice: Subject to any disclaimer, the term of this patent is extended or adjusted under 35 U.S.C. 154(b) by 0 days.

(21) Appl. No.: 18/648,318

(22) Filed: Apr. 26, 2024

(65) Prior Publication Data

US 2025/0043618 A1 Feb. 6, 2025

Related U.S. Application Data

(63) Continuation-in-part of application No. 18/229,619, filed on Aug. 2, 2023, now Pat. No. 11,992,143.

(51) Int. Cl.
*E05G 1/08* (2006.01)

(52) U.S. Cl.
CPC ..................................... *E05G 1/08* (2013.01)

(58) Field of Classification Search
None
See application file for complete search history.

(56) References Cited

U.S. PATENT DOCUMENTS

| | | | | |
|---|---|---|---|---|
| 2,169,855 | A * | 8/1939 | Stough | A47G 29/20 232/41 D |
| 3,421,461 | A * | 1/1969 | St Clair | E05G 1/04 109/57 |
| 6,529,949 | B1 * | 3/2003 | Getsin | H04N 21/42646 709/217 |
| 7,269,634 | B2 * | 9/2007 | Getsin | G06F 21/10 709/217 |
| 7,568,618 | B1 * | 8/2009 | Scutellaro | G06Q 50/12 235/383 |
| 8,261,980 | B1 * | 9/2012 | Scutellaro | G06Q 30/04 235/383 |
| 10,482,525 | B2 * | 11/2019 | Mueller | G07G 1/14 |
| 10,885,492 | B2 * | 1/2021 | Goldberg | G06Q 10/087 |
| 10,902,371 | B2 * | 1/2021 | Goldberg | G06Q 10/087 |
| 2002/0130065 | A1 * | 9/2002 | Bloom | B07C 3/00 209/630 |
| 2004/0078346 | A1 * | 4/2004 | Amonette | G07B 17/00362 705/401 |

(Continued)

*Primary Examiner* — Carlos Garcia
(74) *Attorney, Agent, or Firm* — Wilson Dutra, PLLC; Camille A. Wilson

(57) ABSTRACT

The present disclosure provides generally for systems and devices for facilitating secure item retrieval. According to the present disclosure, a secure item retrieval system may comprise at least one secure item retrieval device, at least one provider computing device, at least one recipient computing device, and one or more servers, all communicatively coupled via at least one network connection. In some aspects, the secure item retrieval device may comprise at least one receptacle, wherein the receptacle may comprise a top portion, a bottom portion, at least one sidewall, a first at least one opening, a second at least one opening, and at least one door. In some implementations, the secure item retrieval system may facilitate at least one contactless interaction between a provider and recipient.

20 Claims, 25 Drawing Sheets

(56) References Cited

U.S. PATENT DOCUMENTS

| | | | | |
|---|---|---|---|---|
| 2009/0290023 | A1* | 11/2009 | Lefort | G08B 13/1963 |
| | | | | 348/151 |
| 2010/0146737 | A1* | 6/2010 | Kunnath | A47B 95/02 |
| | | | | 16/415 |
| 2012/0262854 | A1* | 10/2012 | Robert | G06F 1/166 |
| | | | | 361/679.01 |
| 2013/0317693 | A1* | 11/2013 | Jefferies | G06Q 30/0645 |
| | | | | 701/31.5 |
| 2015/0186840 | A1* | 7/2015 | Torres | A47F 10/02 |
| | | | | 705/339 |
| 2017/0172317 | A1* | 6/2017 | Hay | A47F 9/04 |
| 2017/0286905 | A1* | 10/2017 | Richardson | G06Q 10/0836 |
| 2017/0330144 | A1* | 11/2017 | Wakim | G06Q 10/083 |
| 2019/0051083 | A1* | 2/2019 | Goldberg | G07F 9/026 |
| 2019/0051087 | A1* | 2/2019 | Goldberg | G07F 11/46 |
| 2019/0259232 | A1* | 8/2019 | Nandakumar | G06K 19/06028 |
| 2020/0156123 | A1* | 5/2020 | Burlew | A61B 90/70 |
| 2020/0169659 | A1* | 5/2020 | Abbas | H04N 23/661 |
| 2020/0175802 | A1* | 6/2020 | Crawford | G07F 11/007 |
| 2021/0350650 | A1* | 11/2021 | Agapov | H04W 4/14 |
| 2022/0088809 | A1* | 3/2022 | Bozikis | B26B 21/4068 |
| 2023/0312142 | A1* | 10/2023 | -; | B64U 10/25 |
| | | | | 244/6 |

* cited by examiner

SYSTEMS AND DEVICES FOR FACILITATING SECURE ITEM RETRIEVAL

CROSS-REFERENCE TO RELATED APPLICATION

This application claims priority to and the full benefit of U.S. Nonprovisional patent application Ser. No. 18/229,619 (filed Aug. 2, 2023, and titled "SYSTEMS AND DEVICES FOR FACILITATING SECURE ITEM RETRIEVAL"), the entire contents of which are incorporated in this application by reference.

BACKGROUND

The service industry has long been riddled with inefficient bottlenecks that are unpleasant for workers and patrons alike. Crowded venues, long lines, and loud environments make placing and fulfilling requests for goods and services unnecessarily cumbersome, as a relatively small number of employees are often tasked with communicating with a seemingly endless number of customers to receive order information, fulfill orders, and facilitate financial transactions to complete payment for orders. Because each worker is generally only able to serve one customer at a time, potentially dozens or even hundreds of people may be idly waiting for a turn to make a request or receive an item.

For example, bars are service industry venues at which many relatively small transactions may be completed within a relatively short timeframe. On a busy night, a popular bar may be patronized by several hundred people, if not more. Even the most diligent bartenders may struggle to keep track of who is waiting to place an order, what a specialized drink request was supposed to entail, or who is trying to close a tab. These challenges can be compounded if loud music makes hearing difficult or if rude customers attempt to cut in line or dispute order pricing. Being that a bartender can fulfill most orders in a matter of minutes, if not seconds, anything that hinders the bartender's ability to perform tasks in a timely manner can lead to significant losses of revenue for the establishment.

Like the rest of the world, the service industry experienced a major setback on Mar. 11, 2020, when the coronavirus disease known as COVID-19 was officially declared a global pandemic by the World Health Organization ("WHO"). Hundreds of millions of individuals experienced lockdowns, whereby their movement outside of their homes became limited. While many businesses were able to transition to remote work and more contactless ways of conducting operations, the service industry was particularly disadvantaged due to the face-to-face interaction typically required for many tasks. While combined efforts led to great developments in technologies that made contactless transactions easier, limitations still exist, especially with regard to situations in which goods or other items must be exchanged from one person to another.

Even though the ramifications of the COVID-19 on businesses have been mostly overcome, more practical and advanced variations of contactless business transactions remain desired by patrons who have become accustomed to a lifestyle with minimal interaction with other humans. Additionally, both workers and customers who participate in service industry endeavors would benefit from more efficient business models that reduce or eliminate the long lines and chaotic ordering and payment experiences associated with many service industry establishments.

SUMMARY OF THE DISCLOSURE

What is needed are systems, devices, and methods for facilitating secure item retrieval by at least one recipient from at least one provider.

In some aspects, the present disclosure provides a secure item retrieval device. In some embodiments, the secure item retrieval system may comprise at least one receptacle, wherein the at least one receptacle may comprise a top portion, a bottom portion, at least one sidewall, a first at least one opening, a second at least one opening, a first at least one door, and a second at least one door, wherein the first at least one door and the second at least one door may each be alterable between a closed position and an open position, wherein the first at least one door may be configured to physically block access to the first at least one opening when in the closed position and the second at least one door may be configured to physically block access to the second at least one opening when in the closed position, wherein the at least one receptacle may comprise a substantially hollow interior portion configured to removably receive at least one item, and wherein the first at least one door and the second at least one door may each be connected to at least a portion of the secure item retrieval device by at least one attachment mechanism.

In some implementations, the secure item retrieval device of the present disclosure may comprise at least one controller and at least one locking mechanism, wherein the at least one locking mechanism may be alterable between a locked state and an unlocked state, wherein the at least one locking mechanism may be configured to maintain at least one of: the first at least one door and the second at least one door in the closed position when in the locked state, and wherein the at least one controller may be configured to alter the at least one locking mechanism from the locked state to the unlocked state when one or more predetermined conditions are satisfied.

In some aspects, the present disclosure may be directed to a secure item retrieval system. In some implementations, the secure item retrieval system may comprise at least one secure item retrieval device, one or more servers; at least one recipient computing device; and at least one provider computing device, wherein the at least one secure item retrieval device, the one or more servers, the at least one recipient computing device, and the at least one provider computing device may be communicatively coupled via at least one network connection, wherein one or more of: the one or more servers, the at least one recipient computing device, and the at least one provider computing device may comprise at least one storage medium that comprises one or more software instructions configured to be executed by at least one processor.

In some embodiments, a method for facilitating secure item retrieval is disclosed. In some aspects, the method may comprise receiving, via at least one recipient computing device, at least one request for at least one item available from at least one provider; transmitting the at least one request to at least one provider computing device via one or more servers, wherein the at least one recipient computing device, the at least one provider computing device, and the one or more servers may be communicatively coupled via at least one network connection; presenting the at least one request to at least one provider via the at least one provider computing device; receiving at least one indication of request fulfillment via the at least one provider computing device; transmitting the at least one indication of request fulfillment to the at least one recipient computing device; presenting at least one notification of order fulfillment to at least one recipient via the at least one recipient computing device; and transmitting at least one coded signal to the at least one recipient computing device.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

Figure 1A:
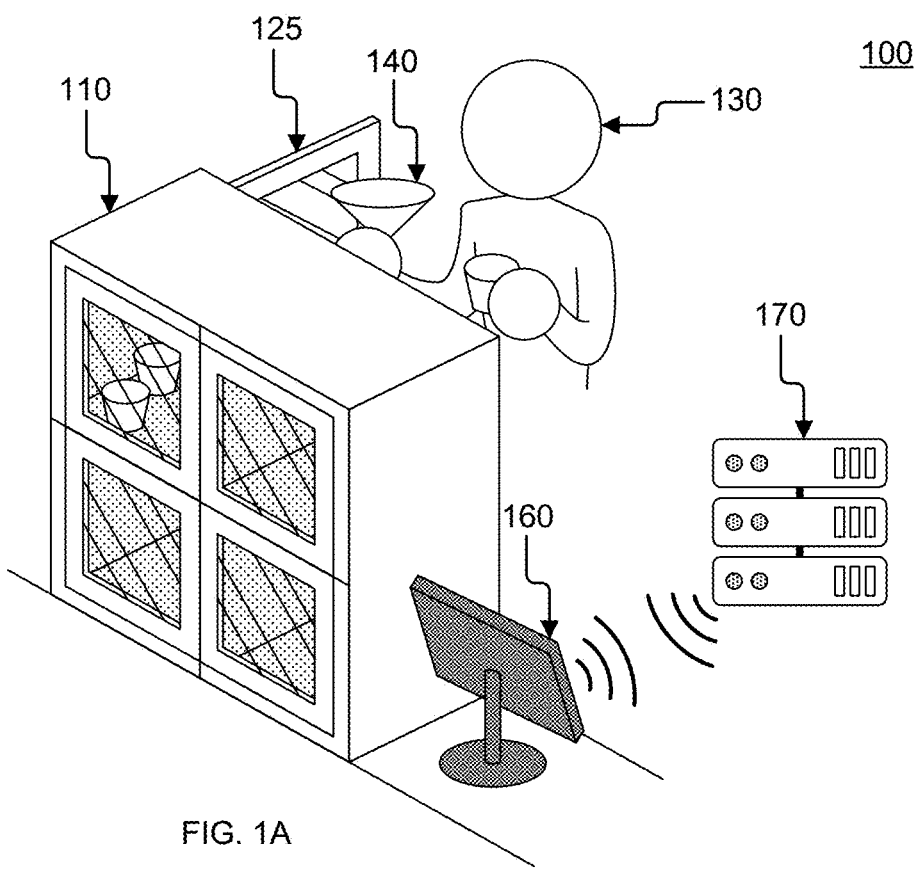
FIG. 1A illustrates an exemplary secure item retrieval system, according to some embodiments of the present disclosure.

The FIGURES of the drawings are not necessarily drawn to scale, as their dimensions can be varied considerably without departing from the scope of the present disclosure.

DETAILED DESCRIPTION

The present disclosure provides generally for systems, devices, methods, and computer program products for facilitating secure item retrieval. According to the present disclosure, a secure item retrieval system may comprise at least one secure item retrieval device, at least one provider computing device, at least one recipient computing device, and one or more external or remote servers, wherein the secure item retrieval device, the provider computing device, and the recipient computing device may be communicatively coupled via the servers using at least one network connection, such as, for example and not limitation, a connection to the global, public Internet, a connection to a local area network ("LAN"), or a connection to a cellular communications network.

In some aspects, the secure item retrieval device may comprise at least one receptacle, wherein the receptacle may comprise a top portion, a bottom portion, at least one sidewall, a first at least one opening, a second at least one opening, a substantially hollow interior portion, and at least one door. In some implementations, the secure item retrieval system may allow a provider of one or more items, objects, or goods to position at least one item within at least one receptacle of the securing item retrieval device and facilitate access to the item within the receptacle by a recipient who may receive at least temporary authorization to open at least one door of the secure item retrieval device, thereby allowing the recipient to remove the item from the securing item retrieval device and facilitating a contactless interaction between the provider and the recipient.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Provider: as used herein refers to any entity that may supply at least one item, object, or good to at least one recipient. By way of example and not limitation, a recipient may comprise a person, group of persons, business, organization, or mechanical apparatus, as non-limiting examples. By way of further example and not limitation, an item may comprise at least one beverage, at least one foodstuff, at least one purchased item, at least one medicinal substance, or any tangible item, as non-limiting examples.

Recipient: as used herein refers to any entity that may receive at least one item from at least one provider. By way of example and not limitation, a recipient may comprise a person, group of persons, or mechanical apparatus, as non-limiting examples. In some non-limiting exemplary embodiments, a recipient may form an at least temporary relationship with a provider, wherein the relationship may comprise a customer and merchant relationship, medical professional and patient relationship, or a principal and beneficiary relationship, as non-limiting examples.

Coded signal: as used herein refers to any electrical impulse, radio wave, or similar mechanism or element that may be transmitted, either wirelessly or via one or more wired connections, from one device, component, machine, or apparatus to another.

Figure 1B:
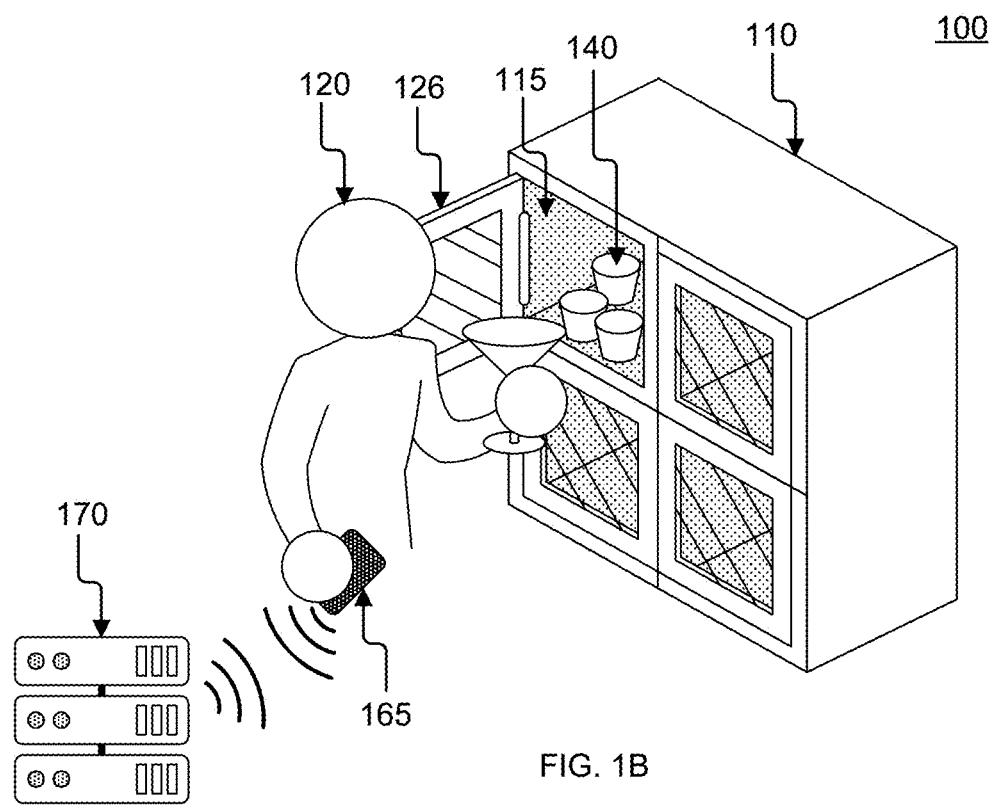
FIG. 1B illustrates an exemplary secure item retrieval system, according to some embodiments of the present disclosure.

Referring now to FIGS. 1A and 1B, an exemplary secure item retrieval system 100, according to some embodiments of the present disclosure, is illustrated. In some implementations, the secure item retrieval system 100 may comprise at least one secure item retrieval device 110, wherein the secure item retrieval device 110 may be configured to facilitate an ability of at least one provider 130 to transfer or deliver at least one item 140 to at least one recipient 120. In some aspects, a secure item retrieval device 110 may comprise at least one receptacle 115, wherein the receptacle 115 may comprise a top portion, a bottom portion, at least one sidewall, a first at least one opening, a second at least one opening, a substantially hollow interior portion, and at least one door 125, 126.

In some embodiments, the first opening of the receptacle 115 may be configured within a portion of the secure item retrieval device 110 that opposes a portion of the secure item retrieval device 110 within which the second opening may be configured. In some non-limiting exemplary implementations, the secure item retrieval device 110 may comprise a generally cuboidal shape, and the first opening may be configured within a first rectangular sidewall that opposes a second rectangular sidewall that comprises the second opening. In some aspects, each door 125, 126 of the secure item retrieval device 110 may be alterable between a closed position and an open position. In some implementations, a first door 125 may physically block access to the first opening when in the closed position, and a second door 126 may physically block access to the second opening when in the closed position. In some embodiments, each of the doors 125, 126 may be movable between the open position and the closed position when at least one external force is applied to at least a portion of each door 125, 126.

In some aspects, the applied external force may emanate from a human or mechanical source. In some implementations, each door 125, 126 may comprise an at least partially open position when the door 125, 126 comprises a position that allows the first or second opening associated therewith to be accessible by at least one of: the provider 130 and the recipient 120. In some non-limiting exemplary embodiments, at least a portion of at least one edge of each door 125, 126 may be connected to at least a portion of the secure item retrieval device 110 by at least one attachment mechanism, such as, for example and not limitation, at least one hinge, wherein each door 125, 126 may be configured to move between the open position and the closed position via the attachment mechanism, such as, for example and not limitation, by pivoting about an axis of rotation defined by the hinge(s) in at least a first direction and a second direction. In some implementations, at least one of the doors 125, 126 may comprise an at least partially transparent portion, such as, for example and not limitation, a glass or plastic portion, to allow for visibility within the interior portion of the receptacle 115.

In some embodiments, the secure item retrieval device 110 may comprise at least one locking mechanism, wherein the locking mechanism may be configured to be altered between a locked state and an unlocked state, wherein the locking mechanism may be configured to maintain at least one of the doors 125, 126 in the closed position when the locking mechanism is in the locked state. In some implementations, the secure item retrieval device 110 may comprise a separate locking mechanism for each door 125, 126. In some aspects, the secure item retrieval device 110 may comprise a single locking mechanism that interacts with one or more of the doors 125, 126.

In some implementations, the locking mechanism may be configured to be configured to be altered to an unlocked state when one or more predetermined conditions are satisfied, thereby allowing one or more of the doors 125, 126 to be moved to an at least partially open position to allow access to the inner portion of the receptacle 115 by a provider 130 and/or a recipient 120. In some aspects, the locking mechanism may comprise a mechanical or electronic locking mechanism. In some non-limiting exemplary embodiments, the locking mechanism may be remotely activated or deactivated, or the locking mechanism may comprise one or more magnetic or electromagnetic components, as non-limiting examples.

In some aspects, the secure item retrieval device 110 may comprise at least one controller. In some implementations, the controller may be configured to alter an electronic locking mechanism of the secure item retrieval device 110 between a locked state and an unlocked state when the controller receives one or more inputs that satisfy one or more predetermined conditions. In some non-limiting exemplary embodiments, the controller may be communicatively coupled to at least one receiving or sensing device configured to receive one or more wireless data signals from at least one of: at least one provider computing device or at least one recipient computing device, wherein the wireless data signals may be transmitted via at least one public network connection, at least one local area network connection, at least one cellular network connection, at least one Bluetooth® connection, or at least one near-field communication ("NFC") connection, as non-limiting examples.

In some non-limiting exemplary implementations, the controller may be configured to receive one or more inputs from at least one input device integrated with or affixed to at least one portion of the secure item retrieval device 110. In some aspects, the input device may comprise one or more of: a keypad, a touchscreen, a keyboard, a microphone, a motion detector, a receiving device, a camera, a chip reader, or a biometric scanner, as non-limiting examples. In some embodiments, the input device may be communicatively coupled, either wirelessly or via a direct wired connection, to the controller such that the input device may be able to transmit at least one input to the controller.

In some aspects, at least one of: the provider computing device, the recipient computing device, and the input device may be configured to receive at least one input from at least one of: the provider 130 and the recipient 120. In some embodiments, the received input may be transmitted to the controller of the secure item retrieval device 110. In some implementations, the controller of the secure item retrieval device 110 may be configured to determine whether the received input satisfies one or more predetermined conditions.

In some non-limiting exemplary embodiments, a predetermined condition may comprise an expected or required input that comprises at least one input datum that matches at least one conditional datum that may be at least temporarily stored within at least one storage medium communicatively coupled to the controller. In some implementations, upon a determination that received input data matches stored conditional data, the controller may transmit at least one signal to the electronic locking mechanism that alters the locking mechanism from the locked state to the unlocked state or from the unlocked state. In some aspects, required conditional data may comprise one or more of: an expected signal transmission, a password, a passcode, or an expected biometric input, as non-limiting examples.

As a non-limiting illustrative example, a recipient 120 may be granted at least temporary authorization to access the interior portion of at least one receptacle 115 of the secure item retrieval device 110 by a provider 130. In some aspects, conditional data may be transmitted to the recipient computing device 165 from the provider computing device 160 such that the recipient computing device 165 may be able to generate user data that replicates the conditional data, wherein recipient 120 may be able to transmit the generated input data to the controller of secure item retrieval device 110 that matches the conditional data, thereby causing the controller to alter an electronic locking mechanism of the receptacle 115 to an unlocked state.

By way of example and not limitation, the recipient 120 may order an item 140 in the form of a beverage from the provider 130 via the secure item retrieval system 100, and after submitting the order, at least one coded signal or instructional data capable of generating at least one coded signal may be transmitted to the recipient computing device 165, either from the provider computer device 160 or from the servers 170. In some aspects, the recipient 120 may be able to transmit the coded signal to the controller of the secure item retrieval device 110 by completing at least one interaction with the recipient computing device 165, such as, for example and not limitation, by swiping or dragging a button along a portion of a graphical user interface presented via a touchscreen integrated with the recipient computing device 165, whereby completing the interaction may cause the coded signal to be transmitted from the recipient computing device 165 to the secure item retrieval device 110 controller, wherein the coded signal may satisfy the predetermined conditions required to at least temporarily alter the electronic locking mechanism of the receptacle 115 to the unlocked state.

As an additional non-limiting illustrative example, a recipient 120 may use the secure item retrieval system 100 to order a beverage from a provider 130. Once the order has been received by the secure item retrieval system 100, at least one coded signal or at least one datum comprising instructions for generating at least one coded signal may be transmitted to the recipient computing device 165, either from the provider computing device 160 or from the servers 170. In some aspects, the coded signal may be configured with one or more near-field communication ("NFC") protocols such that the coded signal may be transmitted from the recipient computing device 165 to at least one receiving device communicatively coupled to at least one controller configured within a secure item retrieval device 110 when the recipient computing device 165 is proximate to the secure item retrieval device 110.

In some non-limiting exemplary embodiments, the coded signal may be transmitted from the recipient computing device 165 to the controller when the recipient computing device 165 is within a maximum threshold distance from the secure item retrieval device 110. By way of example and not limitation, the coded signal may be transmitted from the recipient computing device 165 to the controller when the recipient computing device 165 is within 4 cm of the secure item retrieval device 110. In some implementations, once the coded signal is received by the controller of the secure item retrieval device 110, the controller may cause at least one electronic locking mechanism to be altered to an unlocked state such that the recipient 120 may open at least one door 125, 126 of the secure item retrieval device 110 to receive the beverage that may have been placed therein by the provider 130.

In some aspects, the recipient computing device 165, the provider computing device 160, and/or the servers 170 may comprise at least one storage medium that comprises one or more coded instructions or algorithms that when executed by at least one processor within the recipient computing device 165, the provider computing device 160, and/or the servers 170 enable the recipient computing device 165, the provider computing device 160, and/or the servers 170 to interact with one or more of the other components of the secure item retrieval system 100 and perform one or more methods or processes that may be facilitated by the secure item retrieval system 100.

In some non-limiting exemplary embodiments, the coded instructions or algorithms may comprise at least one software application that may be downloaded from or otherwise accessed via the servers 170. In some implementations, the software application or other coded instructions may facilitate the generation of one or more graphical user interfaces that may be presented via at least one display screen integrated with or communicatively coupled to one or both of the recipient computing device 165 and the provider computing device 160.

In some embodiments, the secure item retrieval system 100 may comprise at least one network connection, wherein one or more of: the recipient computing device 165, the provider computing device 160, and the secure item retrieval device 110 may be communicatively coupled to the servers 170 via the network connection. By way of example and not limitation, the network connection may comprise a connection to the global, public Internet, a connection to a local area network ("LAN"), a connection to a point-of-sale system, or a connection to a cellular communications network, as non-limiting examples.

In some aspects, a recipient 120 may be required to register or otherwise be granted authorization to utilize the secure item retrieval system 100. In some implementations, registration may at least partially comprise verification of the identity of the recipient 120. In some embodiments, verifying the identity of the recipient 120 may facilitate more efficient use of the secure item retrieval system 100, such as, for example and not limitation, when the recipient 120 may submit an order or request for one or more items 140 that may comprise at least one type of restrictive aspect or prohibitive feature. In some embodiments, an item 140 may comprise an alcoholic beverage that may be illegal to serve to recipients 120 below a minimum age or a medication prescribed only for a unique recipient 120, as non-limiting examples.

In some implementations, recipient 120 identity verification may at least partially comprise comparing at least one captured image of the recipient 120 to at least one identification document, wherein the identification document may comprise at least one previously-captured photograph of the recipient 120 as well as one or more additional identifying characteristics of the recipient 120, wherein the secure item retrieval system 100 may be configured to validate the authenticity of the identification document. In some non-limiting exemplary embodiments, the identification document may be issued by at least one government entity, agency, or department, or a private business entity or enterprise. By way of example and not limitation, an identification document may comprise a state driver's license issued by a state's department of motor vehicles, a student identification card, or a pass card granting access to a private park, venue, establishment, or club.

In some aspects, an identification document may be validated by comparing one or more elements, features, or informative contents of the identification document to at least one datum stored within at least one database communicatively coupled to the secure item retrieval system 100. By way of example and not limitation, the identification document may comprise one or more visual elements or features, such as watermarks, overlays, or seals, that may be compared to data within a database that indicates the expected appearance and location of such elements or features, or the identification document may comprise identifying information pertaining to a unique recipient 120, such as the name, address, age, or height of the recipient 120, wherein the identifying information may be compared to data contained within at least one database associated with the entity that issued the identification document.

As a non-limiting illustrative example, a recipient 120 may download a software application from the servers 170 to a recipient computing device 165 in the form of a smartphone, wherein the software application may enable the recipient computing device 165 to interact with the secure item retrieval system 100. In some aspects, upon a first attempt of the recipient 120 to access the software application on the recipient computing device 165, the software application may prompt the recipient 120 to use one or more visual capture devices, such as cameras, to capture the front and back portions of a driver's license issued to the recipient 120.

In some implementations, the software application may prompt the recipient 120 to use a camera of the recipient computing device 165 to capture an image of the face of the recipient 120. In some embodiments, the secure item retrieval system 100 may be configured to identify the photograph of the recipient 120 displayed on the front portion of the driver's license to the captured face image to determine whether the recipient 120 is the person identified on the driver's license. In some implementations, the secure item retrieval system 100 may be configured to compare the name, address, age, and height information, as well as a watermark on the driver's license to information data within at least one department of motor vehicles database to assess the accuracy of the information and the watermark, wherein the driver's license may be validated when the information and watermark are determined to be accurate.

In some non-limiting exemplary embodiments, the secure item retrieval system 100 may be configured to determine an estimated accuracy evaluation for an identification document captured or otherwise received from a recipient 120. In some aspects, the accuracy evaluation may comprise a quantified representation of the similarity between the photograph(s) and information within the identification document and one or more photographs or data received via the recipient computing device 165 and/or at least one external database. As a non-limiting illustrative example, a facial image of the recipient 120 may be captured via the recipient computing device 165.

In some aspects, the face of the recipient 120 may not look identical to a photograph of the recipient 120 displayed on the identification document, due to aging, a changed hairstyle, or change in weight, as non-limiting examples. In some implementations, despite one or more changes to the appearance of the face of the recipient 120, the secure item retrieval system 100 may still determine that the recipient is likely to be the individual portrayed in the identification document by qualifying the determination with an accuracy evaluation that indicates that there is at least a partial match between received recipient 120 data and data obtained from the identification document.

By way of example and not limitation, the secure item retrieval system 100 may indicate that there is a 70 percent likelihood that a facial image of the recipient 120 captured by the recipient computing device 165 comprises the same face within a photograph contained within the identification document. In some embodiments, the indication of the accuracy evaluation may comprise a numerical score, rank, percentage, or any similar quantifiable representation.

In some non-limiting exemplary implementations, the secure item retrieval system 100 may be configured to verify the identity of the recipient 120 when the accuracy evaluation comprises at least a minimum threshold value. By way of example and not limitation, the secure item retrieval system 100 may be configured to verify the identity of the recipient recipient 120 when the secure item retrieval system 100 determines that the accuracy evaluation of the identification document comprises at least an 80 percent confidence level that the identification document matches received recipient 120 data.

In some aspects, the secure item retrieval system 100 may be utilized to facilitate transfer of at least one item 140 from at least one provider 130 to at least one recipient 120. In some implementations, the hollow interior portion of the receptacle 115 of the secure item retrieval device 110 may be configured to removably receive at least one item 140 placed therein by a provider 130 through the first opening when the first door 125 is in an at least partially open position. In some embodiments, the recipient 120 may access the interior portion of the receptacle 115 to remove and obtain the item 140 through the second opening when the second door 126 is in an at least partially open position.

In some non-limiting exemplary implementations, at least one locking mechanism may be configured to at least temporarily secure or lock one or both of the first door 125 or the second door 126 in a closed position when the locking mechanism is in a locked state. In some implementations, the locking mechanism may be configured to be altered to an unlocked state that allows one or both of the doors 125, 126 to be moved to an at least partially open position when one or more predetermined conditions have been satisfied, such as, for example and not limitation, via the provider 130 and/or the recipient 120.

As a non-limiting illustrative example, a provider 130 may comprise a bartender, a recipient 120 may comprise a bar patron, and an item 140 may comprise a beverage. In some aspects, the bar patron 120 may order the beverage 140 from the bartender 130 via, for example and not limitation, a software application installed upon and at least partially executed via a recipient computing device 165 in the form of a smartphone. In some implementations, once the beverage 140 has been prepared, the bartender 130 may open the first door 125 to place the beverage 140 within the hollow interior portion of the receptacle 115 of the secure item retrieval device 110 by inserting the beverage 140 through the first opening.

In some non-limiting exemplary embodiments, the bartender 130 may then move the first door 125 to the closed position, whereupon an electronic locking mechanism may be altered to a locked state to maintain the first door 125 and the second door 126 in their respective closed positions to prevent unauthorized individuals from accessing the beverage 140. In some aspects, the bar patron 120 may be granted at least temporary authorization to cause the electronic locking mechanism to be altered to an unlocked state that allows the bar patron 120 to move the second door 126 to an at least partially open position to remove the beverage 140 from the receptacle 115 of the secure item retrieval device 110 through the second opening.

In some implementations, one or more predetermined conditions may need to be satisfied by the recipient 120 to alter at least one locking mechanism to an unlocked state that allows the second door 126 to be moved to an at least partially open position. In some aspects, the locking mechanism may comprise an electronic locking mechanism communicatively coupled to at least one controller that may be configured to receive one or more inputs or coded signals from at least one input device and/or the recipient computing device 165, wherein receipt of one or more required, expected, or correct inputs or coded signals may satisfy the predetermined conditions.

By way of example and not limitation, the predetermined conditions may comprise expected or required inputs in the form of one or more of: a facial recognition scan, an alphanumeric passcode, a fingerprint scan, a coded electronic signal verification, a voice sample, a retinal scan, or any other authorization verification techniques.

In some aspects, upon the satisfaction of the predetermined conditions, the second door 126 may be opened one time, whereupon closing the second door 126 causes the locking mechanism to be altered to the locked state. In some implementations, the recipient computing device 165 may receive the ability to transmit the coded signal a predetermined number of times to unlock the second door 126 before a new coded signal needs to be obtained or generated. In some embodiments, the secure item retrieval device 110 may comprise a physical mechanism such as, for example and not limitation, a switch or lever, that may be altered to different positions to prevent the second door 126 from closing if multiple trips are required to retrieve an order, as a non-limiting example.

Figure 2:
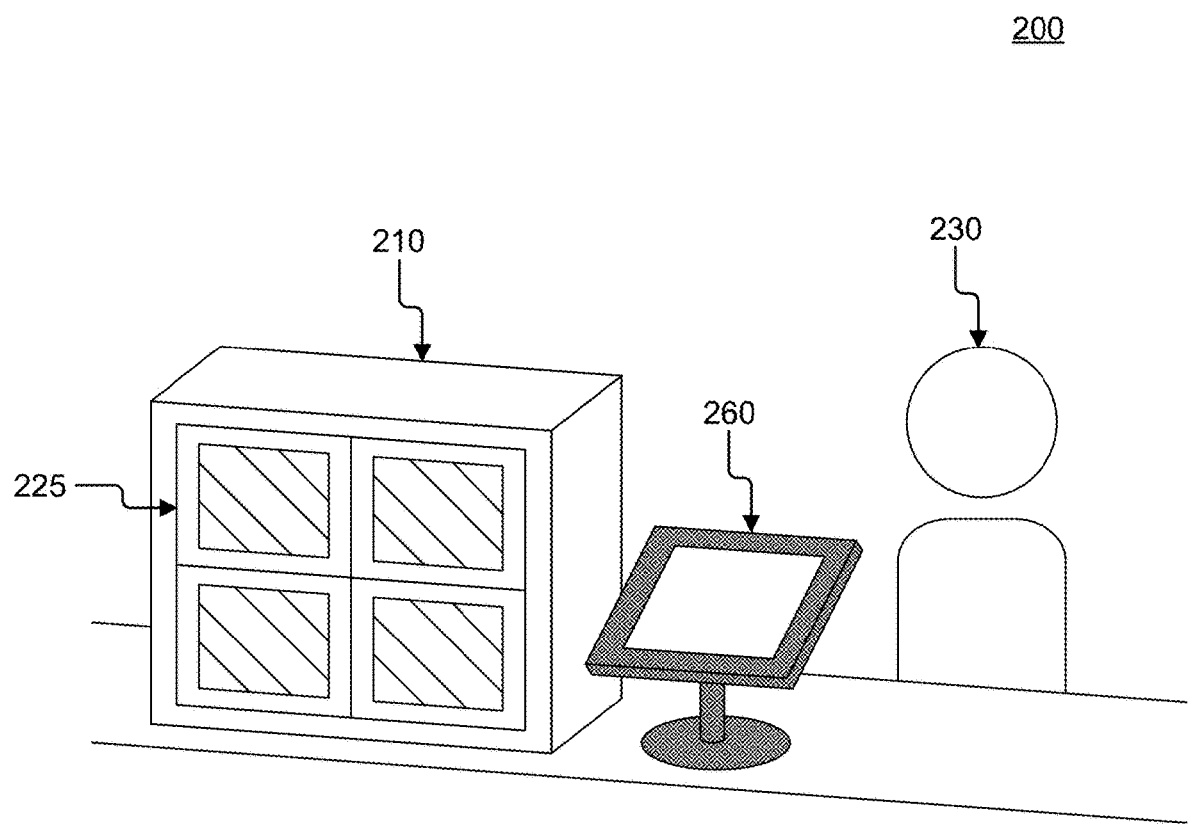
FIG. 2 illustrates an exemplary secure item retrieval system, according to some embodiments of the present disclosure.

Referring now to FIG. 2, an exemplary secure item retrieval system 200, according to some embodiments of the present disclosure, is illustrated. In some implementations, the secure item retrieval system 200 may comprise at least one secure item retrieval device 210, wherein the secure item retrieval device 210 may be configured to facilitate an ability of at least one provider 230 to transfer or deliver at least one item to at least one recipient. In some aspects, a secure item retrieval device 210 may comprise at least one receptacle, wherein the receptacle may comprise a top portion, a bottom portion, at least one sidewall, a first at least one opening, a second at least one opening, a substantially hollow interior portion, and at least one door 225.

In some embodiments, the first opening of the receptacle may be configured within a portion of the secure item retrieval device 210 that opposes a portion of the secure item retrieval device 210 within which the second opening may be configured. In some non-limiting exemplary implementations, the secure item retrieval device 210 may comprise a generally cuboidal shape, and the first opening may be configured within a first rectangular sidewall that opposes a second rectangular sidewall that comprises the second opening. In some aspects, each door 225 of the secure item retrieval device 210 may be alterable between a closed position and an open position. In some implementations, a first door 225 may physically block access to the first opening when in the closed position, and a second door 225 may physically block access to the second opening when in the closed position.

In some embodiments, each of the doors 225 may be movable between the open position and the closed position when at least one external force is applied to at least a portion of each door 225. In some aspects, the applied external force may emanate from a human or mechanical source. In some implementations, each door 225 may comprise an at least partially open position when the door 225 comprises a position that allows the first or second opening associated therewith to be accessible by at least one of: the provider 230 and the recipient.

In some non-limiting exemplary embodiments, at least a portion of at least one edge of each door 225 may be connected to at least a portion of the secure item retrieval device 210 by at least one attachment mechanism, such as, for example and not limitation, at least one hinge, wherein each door 225 may be configured to move between the open position and the closed position by moving in at least one direction via the attachment mechanism, such as, for example and not limitation, by pivoting about an axis of rotation defined by one or more hinges in at least a first direction and a second direction. In some implementations, at least one of the doors 225 may comprise an at least partially transparent portion, such as, for example and not limitation, a glass or plastic portion, to allow for visibility within the interior portion of the receptacle.

In some implementations, the secure item retrieval device 210 may be configured at a position or location to maximize utility and/or efficiency with using the secure item retrieval system 200. By way of example and not limitation, the secure item retrieval device 210 may comprise a size and/or weight that allows it to be at least temporarily placed or secured upon or proximate to the top portion of a bar or similar counter, table, or other surface.

In some non-limiting exemplary embodiments, the secure item retrieval device 210 may comprise a standalone structure that may rest on the ground or floor. In some implementations, the secure item retrieval device 210 may be configured proximate or adjacent to a provider computing device 260, and/or near one or more items of other offerings that may be available from the provider 230 such that the provider 230 may be able to fulfill orders and requests in a timely and efficient manner.

As a non-limiting illustrative example, a provider 230 may comprise a bartender at a restaurant, bar, club, festival or similar venue. In some aspects, in an effort to maximize productivity, at least one secure item retrieval device 210 may be configured on top of the bar counter near a supply of beer, liquor, wine, mixers, spirits, or other beverage items. In some implementations, a provider computing device 260 may be confirmed near or proximate to the secure item retrieval device 210. In some embodiments, this configuration may allow the bartender to receive drink orders via the provider computing device 260, fulfill the drink orders, place the fulfilled orders within one or more receptacles of the secure item retrieval device 210, and notify recipients, via the provider computing device 210, that drink orders are ready to be picked up, all without having to move substantially from a single location, thereby allowing the bartender to perform tasks with a maximum degree of efficiency.

In some aspects, a provider 230 may be able to use the provider computing device 260 to view images of any recipients who may be utilizing the secure item retrieval system 200. In some implementations, this may allow the provider to visually monitor the recipients and take one or more intervening or precautionary measures if necessary. As a non-limiting illustrative example, a provider 230 may comprise a bartender, and the bartender may observe that some of the patrons in the bar have become significantly intoxicated and should no longer be served. The bartender may use the provider computing device 260 to identify the patrons and block them from using the secure item retrieval system 200 to request any more orders from the bartender, either temporarily, such as for the rest of the night, or indefinitely.

In some implementations, the bartender may block the intoxicated patrons from using the secure item retrieval system 200 at any venue associated with any provider 230, thereby preventing other provider 230 from having to accommodate the intoxicated individuals and shielding them from potential liability, as non-limiting examples. In some non-limiting exemplary embodiments, the secure item retrieval device 210 may comprise at least one breathalyzer or similar device configured to measure or approximate a recipient's blood alcohol level integrated therewith or communicatively coupled thereto, wherein the secure item retrieval system 200 may prevent recipients with a blood alcohol level above a maximum threshold from accessing the secure item retrieval device 210 or otherwise using the secure item retrieval system 200.

In some implementations, a provider 230 with administrative access may be able to log in to the secure item retrieval system 200 and influence, control, or adjust one or more parameters associated with the provider computing device 260 or the secure item retrieval system 200. By way of example and not limitation, an administrative provider 230 may be able to block or turn off one or more items from being presented as available from the provider 230 if items are out of stock or the administrative provider 230 may be able to control, modify, or adjust which employees may be able to log in, access, and use the provider computing device 260, as non-limiting examples.

Figure 3:
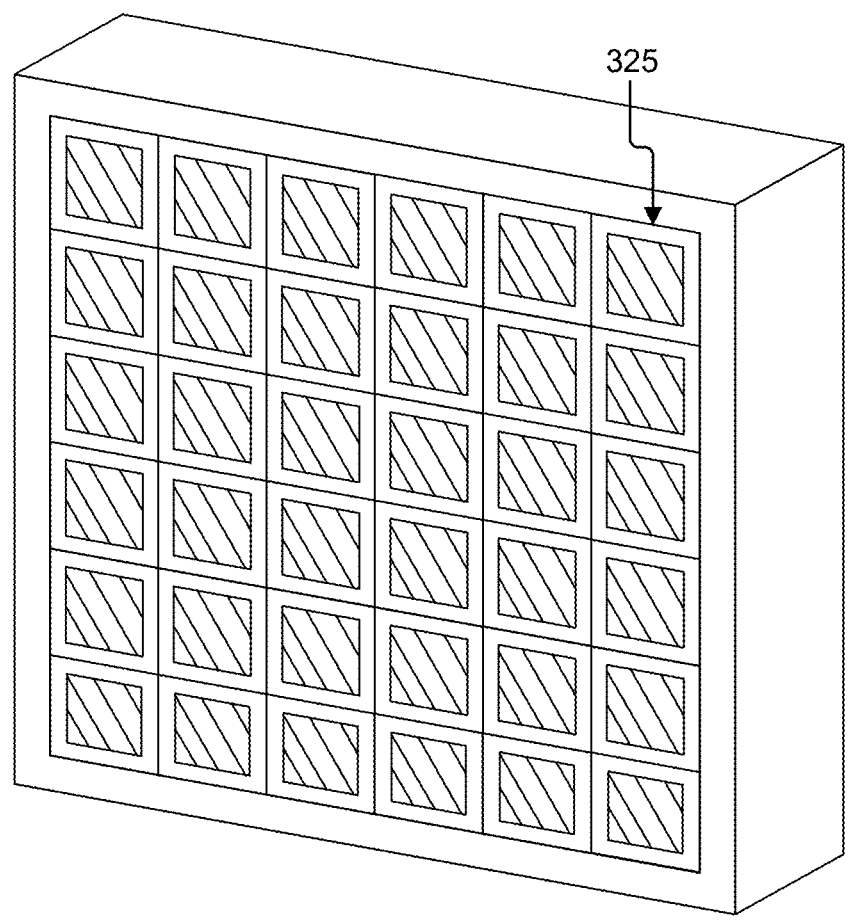
FIG. 3 illustrates an exemplary secure item retrieval device, according to some embodiments of the present disclosure.

Referring now to FIG. 3, exemplary secure item retrieval device 310, according to some embodiments of the present disclosure, is illustrated. In some implementations, the secure item retrieval device 310 may be configured to facilitate an ability of at least one provider to transfer or deliver at least one item to at least one recipient. In some aspects, a secure item retrieval device 310 may comprise at least one receptacle, wherein the receptacle may comprise a top portion, a bottom portion, at least one sidewall, a first at least one opening, a second at least one opening, a substantially hollow interior portion, and at least one door 325. In some non-limiting exemplary embodiments, the secure item retrieval device 310 may comprise a plurality of receptacles.

In some embodiments, the first opening of each receptacle may be configured within a portion of the secure item retrieval device 310 that opposes a portion of the secure item retrieval device 310 within which the second opening may be configured. In some non-limiting exemplary implementations, the secure item retrieval device 310 may comprise a generally cuboidal shape, and the first opening may be configured within a first rectangular sidewall that opposes a second rectangular sidewall that comprises the second opening. In some aspects, each door 325 of the secure item retrieval device 310 may be alterable between a closed position and an open position. In some implementations, a first door 325 may physically block access to the first opening when in the closed position, and a second door may physically block access to the second opening when in the closed position.

In some embodiments, each of the doors 325 may be movable between the open position and the closed position when at least one external force is applied to at least a portion of each door 325. In some aspects, the applied external force may emanate from a human or mechanical source. In some implementations, each door 325 may comprise an at least partially open position when the door 325 comprises a position that allows the first or second opening associated therewith to be accessible by at least one of: the provider and the recipient.

In some non-limiting exemplary embodiments, at least a portion of at least one edge of each door 325 may be connected to at least a portion of the secure item retrieval device 310 by at least one attachment mechanism, such as, for example and not limitation, at least one hinge, wherein each door 325 may be configured to move between the open position and the closed position via the attachment mechanism, such as, for example and not limitation, by pivoting about an axis of rotation defined by one or more hinges in at least a first direction and a second direction. In some implementations, at least one of the doors 325 may comprise an at least partially transparent portion, such as, for example and not limitation, a glass or plastic portion, to allow for visibility within the interior portion of the receptacle 325.

In some non-limiting exemplary implementations, the secure item retrieval device 310 may comprise an enlarged size, which may make the secure item retrieval device 310 suitable for venues or events with large crowds, such as music festivals, concerts, or sporting events, as non-limiting examples. By way of example and not limitation, the secure item retrieval device may comprise a length of approximately 30 to 75 feet. In some non-limiting exemplary implementations, the secure item retrieval device 310 may comprise a length of approximately 48 feet, such that the secure item retrieval device 310 may be configured to be transported via a tractor trailer. In some non-limiting exemplary embodiments, the secure item retrieval device 310 may comprise approximately 120 receptacles, wherein each receptacle may comprise an interior width, height, and depth of approximately 12 inches.

In some aspects, the secure item retrieval device 310 may be configured as a standalone device, such that once the secure item retrieval device 310 is transported to a venue location, the secure item retrieval device 310 may require no additional setup to be utilized. In some embodiments, at least one side portion of the secure item retrieval device 310 may comprise a retractable, slidable, or removable, or other temporary cover that may protect the secure item retrieval device 310 during transport and may be removed via manual or mechanical means to allow access to the receptacles and enable use thereof.

Figure 4:
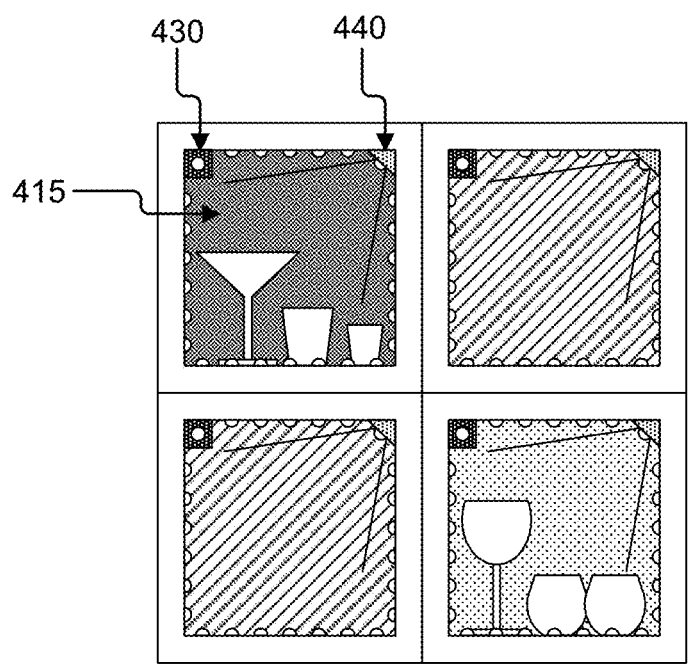
FIG. 4 illustrates an exemplary secure item retrieval device, according to some embodiments of the present disclosure.

Referring now to FIG. 4, an exemplary secure item retrieval device 410, according to some embodiments of the present disclosure, is illustrated. In some aspects, a secure item retrieval device 410 may comprise at least one receptacle 415, wherein the receptacle 415 may comprise a top portion, a bottom portion, at least one sidewall, a first at least one opening, a second at least one opening, and at least one door. In some embodiments, the secure item retrieval device 410 may comprise a plurality of receptacles 415. In some embodiments, the secure item retrieval device 410 may comprise approximately four receptacles 415. In some implementations, each receptacle 415 may comprise a height, width, and depth of approximately 12 inches. In some aspects, each receptacle 415 may comprise one or more hardware components.

In some implementations, each receptacle 415 may comprise at least one image capturing device 430. In some aspects, the image capturing device 430 may be configured to activate and capture at least one image of an interior portion of the receptacle 415 when at least one door that facilitates access to the interior portion of the receptacle 415 is opened or closed. In some embodiments, each captured image may be at least temporarily stored within at least one database such that the contents of a receptacle 415 may be confirmed or verified at different times associated with a door opening or closing action.

As a non-limiting illustrative example, a bartender may place one or more requested beverages within a receptacle 415. Upon closing a door of the receptacle 415 on a side of the secure item retrieval device 410 proximate to the bartender, a controller integrated with or communicatively coupled to the secure item retrieval device 410 may be configured to detect the closing of the door, such as, for example and not limitation, via at least one sensing device, which may cause the controller to activate at least one image capturing device 430. This may be useful, for example and not limitation, to verify that the correct order was placed within the receptacle 415 at the moment the door was closed. In some implementations, a bar patron may open a door on the opposing side of the receptacle 415 to remove the ordered beverages, and the the same or a different image capturing device 430 may be activated by the controller of the secure item retrieval device 410 to capture an image of the bar patron picking up the order, which verify or confirm that the beverages were received by the intended recipient. In some embodiments, once the bar patron closes the door, the image capturing device may be activated a third time to confirm or verify the state of the interior portion of the receptacle 415 immediately after door closure, such as to verify that the entire order was removed and that the receptacle 415 was not damaged soiled, or littered by the bar patron, as non-limiting examples.

In some implementations, the receptacle 415 may comprise at least one light source 440, wherein the activation of the light source 440 may be controlled or regulated by the controller of the secure item retrieval device 410. In some aspects, the light source 440 may be configured to be illuminated in at least one of a plurality of different colors based on one or more instructions in the form of signals received from the controller, wherein the different colors may correspond to different conditions or circumstances. As a non-limiting illustrative example, a light source 440 may display the color green when an item is ready to be retrieved, and the light source may display the color red when the receptacle is empty. As an additional non-limiting illustrative example, a light source 440 may be configured to display a color that may matches a color indicated on a recipient computing device when an item is ready to be picked up, such that the recipient may receive a convenient indication as to which receptacle 415 contains the ordered item.

In some aspects, the image capturing device 430 and/or the light source 440 may be configured at or within a top portion of the receptacle 415. In some embodiments, at least one panel or similar structure may be configured to cover at least a portion of the wiring and other circuitry elements associated with the image capturing device 430 and/or the light source 440 to protect the circuitry and hide it from view.

Figure 5:
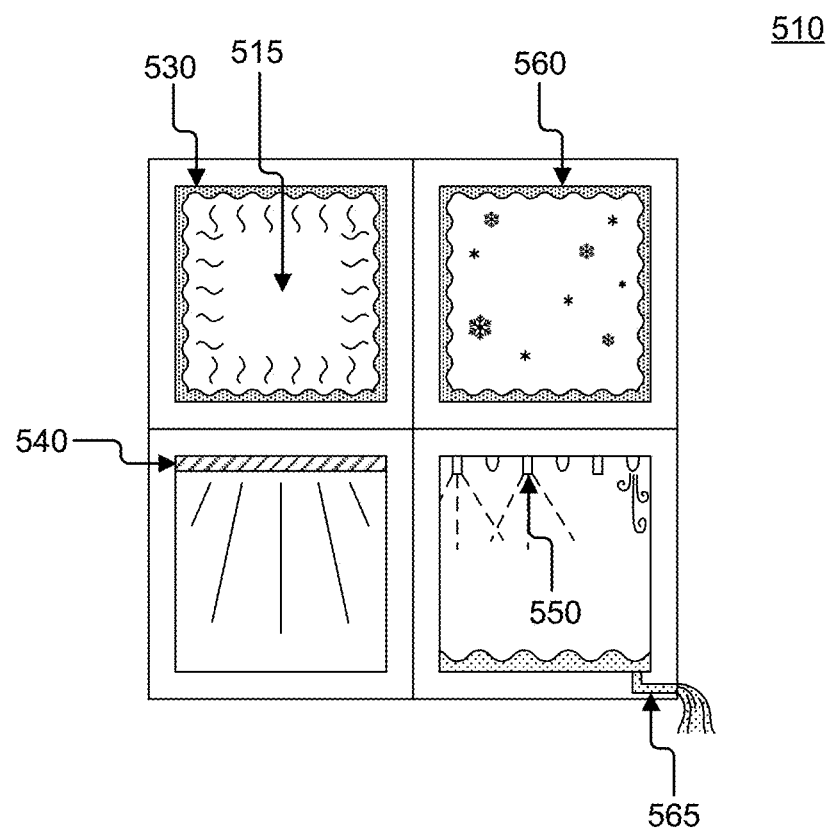
FIG. 5 illustrates an exemplary secure item retrieval device, according to some embodiments of the present disclosure.

Referring now to FIG. 5, an exemplary secure item retrieval device 510, according to some embodiments of the present disclosure, is illustrated. In some aspects, a secure item retrieval device 510 may comprise at least one receptacle 515, wherein the receptacle 515 may comprise a top portion, a bottom portion, at least one sidewall, a first at least one opening, a second at least one opening, and at least one door. In some embodiments, the secure item retrieval device 510 may comprise a plurality of receptacles 515. In some embodiments, the secure item retrieval device 510 may comprise approximately four receptacles 515. In some implementations, each receptacle 515 may comprise a height, width, and depth of approximately 12 inches. In some aspects, each receptacle 515 may comprise one or more hardware components.

In some non-limiting exemplary implementations, at least one receptacle 515 of the secure item retrieval device 510 may comprise at least one heating mechanism 530. In some aspects, the heating mechanism 530 may be communicatively coupled to at least one controller integrated with or communicatively coupled to the secure item retrieval device 510, wherein the controller may be configured to activate the heating mechanism 530 in response to one or more detected or received stimuli, inputs, or events, such as a time lapse or duration, a time occurrence, a sensor detection, or a manual input, as non-limiting examples.

As a non-limiting illustrative example, an item may comprise a foodstuff or beverage that may be required or preferred to be consumed at a temperature above ambient temperature. In some aspects, after placing such item within a receptacle 515, a provider of the item may use an input device integrated with or communicatively coupled to the secure item retrieval device 510, or a provider computing device, to activate the heating mechanism 530 maintain the temperature within the receptacle 515 at a preferred or required setting while awaiting retrieval from the recipient. By way of example and not limitation, the heating mechanism. 530 may comprise one or more of: a heating coil, a tubular heater, a strip heater, microwave-style radio waves.

In some non-limiting exemplary embodiments, at least one receptacle 515 of the secure item retrieval device 510 may comprise at least one cooling mechanism 560. In some aspects, the cooling mechanism 560 may be configured to be activated by the controller of the secure item retrieval device 510 in response to one or more detected or received stimuli, inputs, or events, such as a time lapse or duration, a sensor detection, or a manual input, as non-limiting examples. As a non-limiting illustrative example, an item from a provider may comprise a cold or chilled beverage, and the cooling mechanism 560 may be activated to maintain the beverage at a cool temperature while awaiting retrieval from the recipient that ordered the beverage. By way of example and not limitation, the cooling mechanism 560 may comprise bone or more of: a refrigeration system and an amount of insulation.

In some non-limiting exemplary implementations, at least one receptacle 515 of the secure item retrieval device 510 may comprise at least one ultraviolet ("UV") light source 540. In some aspects, the UV light source 540 may be configured to sanitize the interior portion receptacle 515 between uses and/or to sanitize one or more items within the receptacle 515. In some embodiments, activation of the UV light source may be at least partially controlled or regulated by the controller of the secure item retrieval device 510.

In some non-limiting exemplary embodiments, at least one receptacle 515 of the secure item retrieval device 510 may comprise at least one cleaning mechanism 550. In some aspects, the cleaning mechanism 550 may be configured to be activated by the controller of the secure item retrieval device 510 in response to one or more received stimuli, inputs, or events, such as time lapse or duration, a sensor detection, or a manual input, as non-limiting examples. As a non-limiting illustrative example, the controller may be programmed to activate the cleaning mechanism 550 at the conclusion of a business's operating hours each day. In some aspects, this may allow for the secure item retrieval device 510 to clean spills, stains, or germs within the receptacle 515 in an at least partially autonomous manner. By way of example and not limitation, the cleaning mechanism 550 may comprise one or more of: a water nozzle, a soap dispenser, an agitator, and a brush. In some non-limiting exemplary embodiments, the receptacle 515 may comprise at least one drainage pipe 565 configured to drain water, soap, dirt, or debris out of the receptacle 515 during or after a cleaning process.

Figure 6:
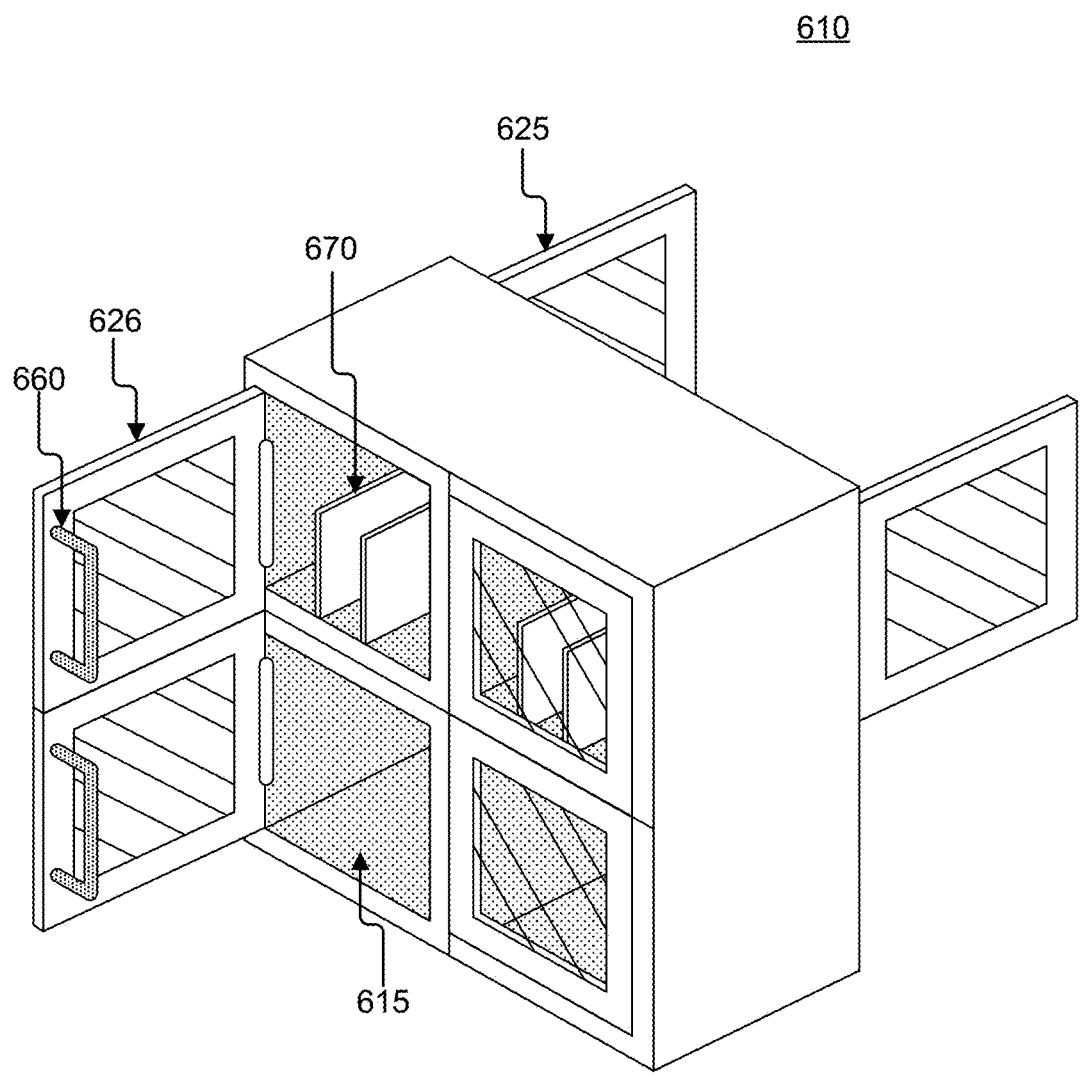
FIG. 6 illustrates an exemplary secure item retrieval device, according to some embodiments of the present disclosure.

Referring now to FIG. 6, an exemplary secure item retrieval device 610, according to some embodiments of the present disclosure, is illustrated. In some aspects, a secure item retrieval device 610 may comprise at least one receptacle 615. In some implementations, the receptacle 615 may comprise a first at least one opening, a second at least one opening, a first at least one door 625, and a second at least one door 626. In some aspects, the receptacle 615 may comprise one or more of a variety of hardware components.

In some non-limiting exemplary implementations, at least one receptacle 615 of the secure item retrieval device 610 may comprise at least one dividing mechanism 670. In some aspects, the dividing mechanism 670 may provide structural support to a plurality of items within the interior portion of the receptacle 615. In some embodiments wherein a plurality of items may comprise one or more beverages, the dividing mechanism 670 may be configured to help prevent the beverages from tipping or spilling. In some aspects, a bottom portion of the receptacle 615 may comprise a spill mat to minimize any damage or mess that may be caused by a spilled beverage.

In some non-limiting exemplary embodiments, each door 625, 626 may comprise an exterior surface oriented away from the secure item retrieval device 610 when the door 625, 626 is in the closed position and an interior surface oriented toward the secure item retrieval device 610 when the door 625, 626 is in the closed position. In some implementations, the exterior surface and the interior surface of at least one of the doors 625, 626 may each comprise at least one handle 660. In some aspects, a handle configured upon an interior surface of a door 625, 626 may allow a provider to reach through the interior portion of the receptacle 615, grab the handle 660, and pull the door 625, 626 closed without having to move to a different side of the secure item retrieval device 610, which may allow the provider to work with maximum efficiency during instances wherein a recipient may fail to close a door 625, 626.

Figure 7:
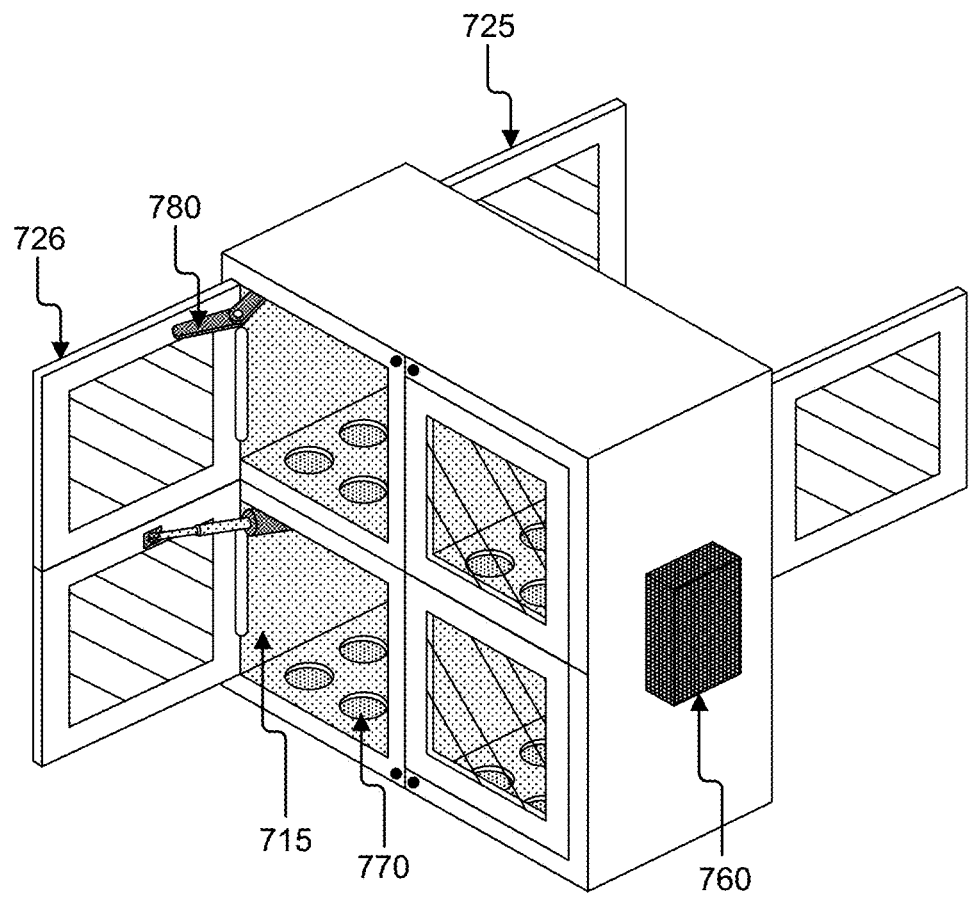
FIG. 7 illustrates an exemplary secure item retrieval device, according to some embodiments of the present disclosure.

Referring now to FIG. 7, an exemplary secure item retrieval device 710, according to some embodiments of the present disclosure, is illustrated. In some aspects, a secure item retrieval device 710 may comprise at least one receptacle 715. In some implementations, the receptacle 715 may comprise a first at least one opening, a second at least one opening, and at least one door 725, 726. In some aspects, the receptacle 715 may comprise one or more of a variety of hardware components. By way of example and not limitation, the receptacle 715 may comprise at least one cup holder 770. In some aspects, the cup holder 770 may be configured to provide structural support to one or more items within the receptacle 715, such as, for example and not limitation, one or more beverages, to help prevent the beverages from spilling or tipping.

In some non-limiting exemplary embodiments, the secure item retrieval device 710 may comprise at least one actuator 780, wherein the actuator 780 may be configured to mechanically facilitate movement of each door 725, 726 between an open position and a closed position. In some aspects, the actuator 780 may be communicatively coupled to at least one controller integrated with or communicatively coupled to the secure item retrieval device 710 such that the controller may be configured to control or regulate performance of the actuator 780. In some non-limiting exemplary implementations, the controller may be configured to activate the actuator 780 when one or more predetermined conditions are satisfied. By way of example and not limitation, the predetermined conditions may comprise expected or required inputs in the form of one or more of: a facial recognition scan, an alphanumeric passcode, a fingerprint scan, a coded electronic signal verification, a voice sample, a retinal scan, or any other authorization verification techniques.

As a non-limiting illustrative example, the actuator 780 may comprise a hinged or piston style device, wherein a first end of the actuator may be secured at or near one portion of the receptacle 715 and a second end of the actuator 780 may be secured to a portion of at least one door 725, 726, such as, for example and not limitation, an interior surface of a door 725, 726. In some implementations, the actuator 780 may be driven by one or more of: an electric motor, a spring-based mechanism, or a pneumatic process, as non-limiting examples.

In some aspects, the secure item retrieval device 710 may comprise at least one power source 760 configured to power one or more components of the secure item retrieval device 710. By way of example and not limitation, the power source 760 may comprise one or more of: at least one battery and at least one photovoltaic cell. In some non-limiting exemplary embodiments, a power source 760 in the form of a battery may comprise a voltage between 0 and 24 volts. As a non-limiting illustrative example, the power source 760 may comprise a 12-volt battery. In some implementations, the power source 760 may enable the secure item retrieval device 710 to operate within a secure item retrieval system without requiring any external power supply, wherein wireless data communication between the various components of the secure item retrieval system may be facilitated by at least one cellular network connection, as a non-limiting example. In some embodiments, the power source 760 may be integrated with or secured to at least one portion of the secure item retrieval device 710, such as an exterior or interior portion of a sidewall, or upon or within a top or bottom portion of the secure item retrieval device 710, as non-limiting examples.

Figure 8:
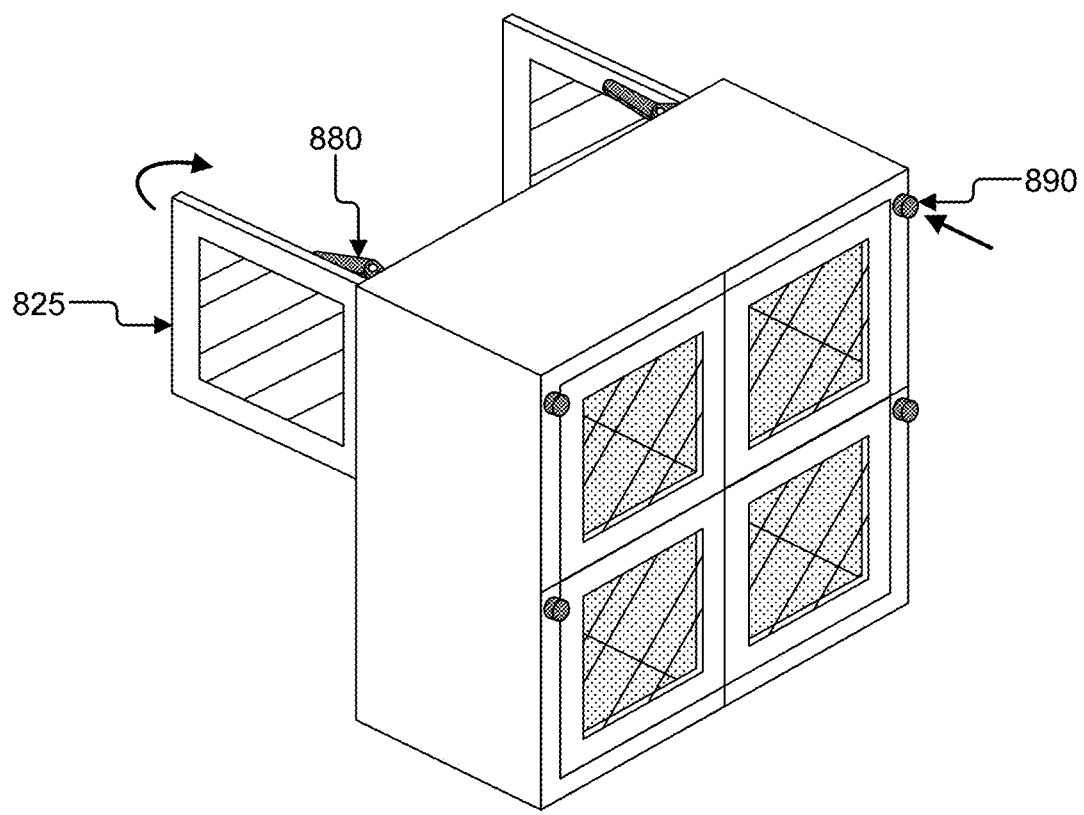
FIG. 8 illustrates an exemplary secure item retrieval device, according to some embodiments of the present disclosure.

Referring now to FIG. 8, an exemplary secure item retrieval device 810, according to some embodiments of the present disclosure, is illustrated. In some aspects, the secure item retrieval device 810 may comprise at least one actuator 880, wherein the actuator 880 may be configured to facilitate movement of at least one door 825 of the secure item retrieval device 810 between an open position and a closed position. In some implementations, the actuator 880 may be configured to be activated via at least one activation device 890, such as, for example and not limitation, a button or switch, which may facilitate convenient usage of the secure item retrieval device 810.

In some non-limiting exemplary embodiments, the actuator 880 may be communicatively coupled to at least one controller integrated with or communicatively coupled to the secure item retrieval device 810 such that the controller may be configured to control or regulate performance of the actuator 880. In some non-limiting exemplary implementations, the controller may be configured to allow activation of the actuator 880 via the activation device 890 only when one or more predetermined conditions are satisfied.

By way of example and not limitation, the predetermined conditions may comprise expected or required inputs in the form of one or more of: a facial recognition scan, an alphanumeric passcode, a fingerprint scan, a coded electronic signal verification, a voice sample, a retinal scan, or any other authorization verification techniques. In some embodiments, the controller may be configured to instruct the actuator 880 to automatically close any door 825 associated therewith after a predetermined amount of time, when the activation device 890 is engaged, or when one or more relevant inputs are received from a provider computing device or a recipient computing device, as non-limiting examples.

Figure 9:
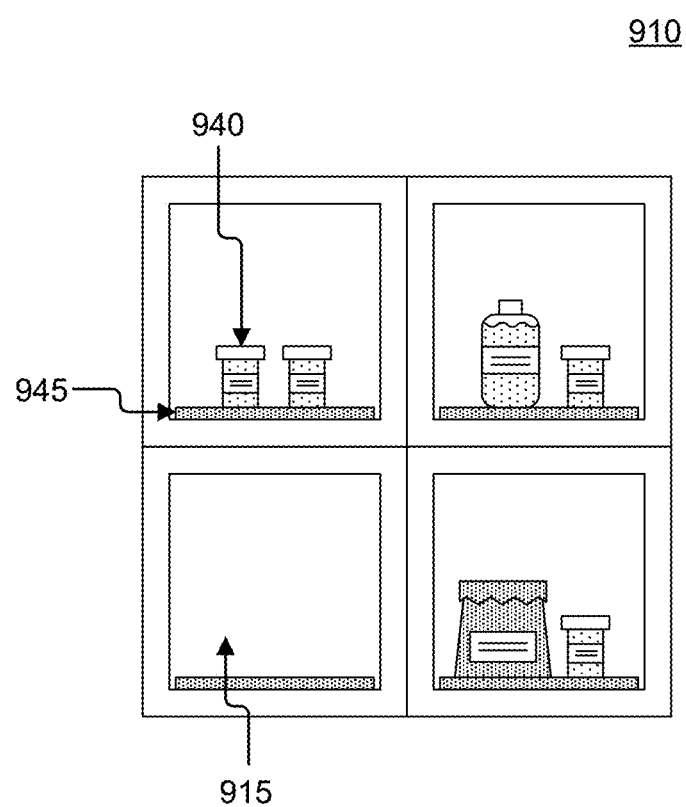
FIG. 9 illustrates an exemplary secure item retrieval device, according to some embodiments of the present disclosure.

Referring now to FIG. 9, an exemplary secure item retrieval device 910, according to some embodiments of the present disclosure, is illustrated. In some aspects, the secure item retrieval device 910 may comprise at least one receptacle 915, wherein the receptacle 915 may comprise a top portion, a bottom portion, at least one sidewall, a first at least one opening, a second at least one opening, and at least one door. In some embodiments, the secure item retrieval device 910 may comprise a plurality of receptacles 915. In some embodiments, the secure item retrieval device 910 may comprise approximately four receptacles 915. In some aspects, each receptacle 915 may comprise one or more of a variety of hardware components.

In some non-limiting exemplary implementations, the secure item retrieval device 910 may be configured to facilitate transfer, delivery, exchange, or conveyance of one or more items 940 that comprise at least one medical or pharmaceutical substance. In some aspects, an interior portion, such as, for example and not limitation, a bottom portion of the receptacle 915 may comprise at least one weight or mass detection device 945, such as, for example and not limitation, an electronic or spring-based scale or a presence or occupancy sensor. In some embodiments, this may allow one or more remote users to use one or more computing devices communicatively coupled to a secure item retrieval system to receive a determination or indication of whether the receptacle 915 currently comprises any items 940. In some aspects, this may provide reassurance or confirmation to one or more family members, caregivers, or loved ones as to whether a resident of a nursing home, retirement home, assisted living care, or assisted living facility is routinely receiving medication at scheduled times.

As a non-limiting illustrative example, the secure item retrieval device 910 may comprise at least one receptacle 915 that comprises a bottom portion that comprises at least one detection device 945 in the form of an electronic scale. In some aspects, the detection device 945 may be configured with a sensitivity that allows the detection device 945 to transmit at least one datum to at least one controller of the secure item retrieval device 910 that indicates that the receptacle 915 is occupied when one or more pharmaceutical or medical substances are placed therein. In some implementations, this may allow one or more remote users to receive real-time data indicating the contents of the receptacle 915 at any moment in time. By way of example and not limitation, a remote user may receive an indication via a computing device in the form of a smartphone that one or more items 940 comprising medication were placed in the receptacle 915 at 1:00 pm due to a detection received via the detection device 945, and that such items 940 were removed at 1:30 pm. If this is the time during which medication is typically delivered to a nursing home resident, the remote user may obtain a degree of confidence that the detected interactions comprised the expected delivery and receipt of medication. In some non-limiting exemplary embodiments, the secure item retrieval device 910 may comprise one or more inn m age capturing devices, such as, for example and not limitation, cameras, to capture external images proximate to the secure item retrieval device 910 during the detection occurrences to verify who may be delivering and receiving the medication, which may further increase the verification obtained by the remote user.

In some aspects, the secure item retrieval device 910 may be used by a provider that comprises a pharmacy or other provider of presentation medication. In some implementations, a recipient may be able to use a recipient computing device or an input device integrated with or communicatively coupled to the secure item retrieval device 910 to schedule a prescription refill for a specified date and/or time and input and process health insurance information. In some embodiments, the recipient may pick up the prescription once ready by swiping, scanning, or otherwise providing information from an official identification document to the secure item retrieval device 910 and then providing one or more biometric inputs via at least one biometric scanning device to confirm the identity of the recipient.

Figure 10:
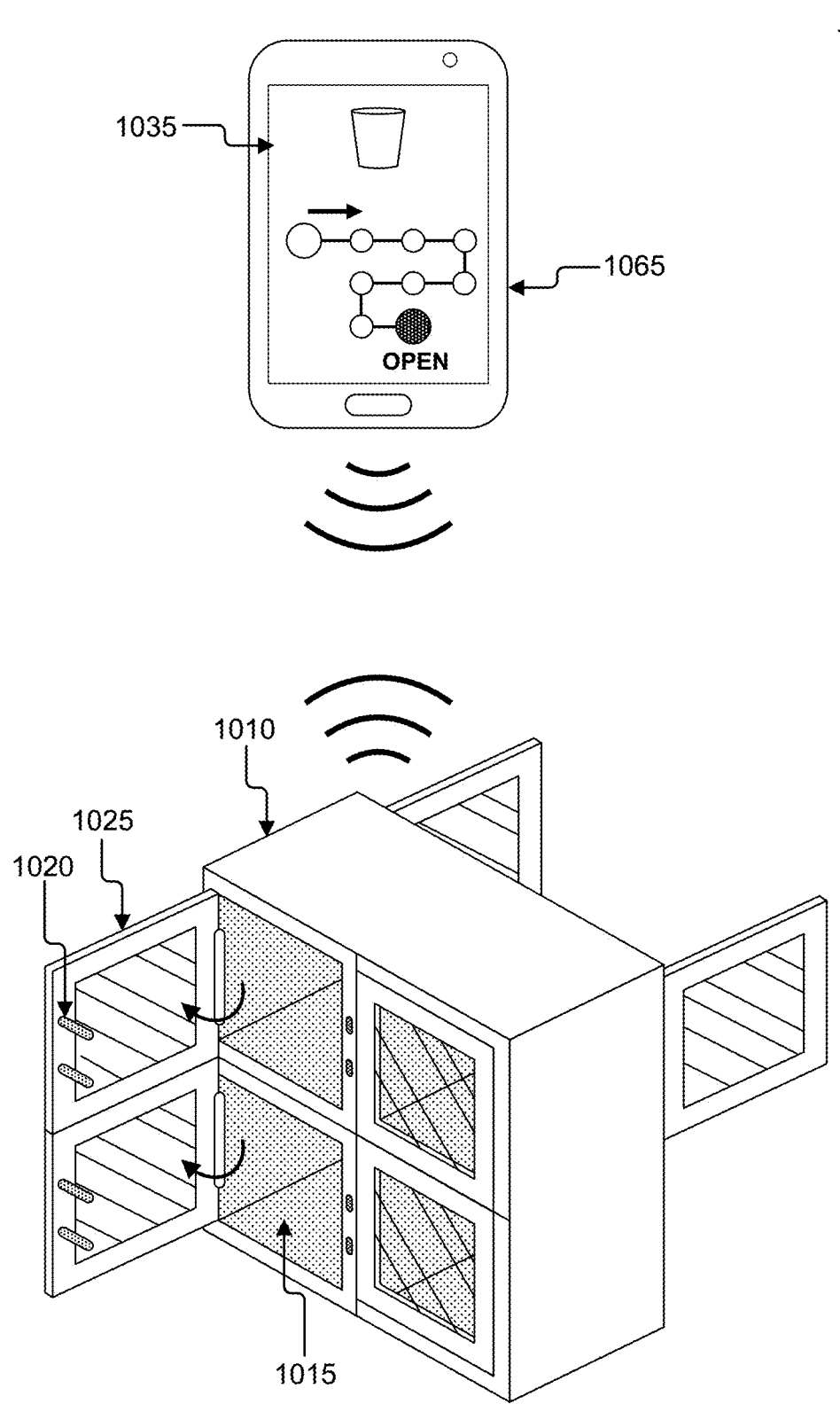
FIG. 10 illustrates an exemplary secure item retrieval system, according to some embodiments of the present disclosure.

Referring now to FIG. 10, an exemplary secure item retrieval system 1000, according to some embodiments of the present disclosure, is illustrated. In some aspects, the secure item retrieval system 1000 may comprise at least one secure item retrieval device 1010. In some embodiments, the secure item retrieval device 1010 may comprise at least one securing mechanism 1020. In some implementations, the securing mechanism 1020 may be configured to interact with at least one locking mechanism, wherein the locking mechanism may be alterable between a locked state and an unlocked state. In some non-limiting exemplary embodiments, the locking mechanism may comprise an electronic locking mechanism communicatively coupled to at least one controller, wherein the controller may be configured to alter the locking mechanism to the unlocked state only when one or more predetermined conditions are satisfied.

In some aspects, the secure item retrieval system 1000 may comprise one or more coded software instructions or algorithms configured to generate and present one or more graphical user interfaces 1035 via a recipient computing device 1065. In some implementations, the graphical user interface 1035 may allow a recipient to submit at least one order or request for one or more items or receive one or more notifications, such as, for example and not limitation, text messages, sounds, vibrations, images, or other notifications or alerts presented or generated by the recipient computing device 1065 that may indicate that the items are available and ready to be retrieved.

In some embodiments, the graphical user interface 1035 may be configured to receive one or more inputs or interactions from a recipient via the recipient computing device 1035, wherein such inputs or interactions may satisfy one or more predetermined conditions required to alter a locking mechanism of the secure item retrieval device 1010 to an unlocked state that may allow the recipient to obtain at least temporary access to at least one receptacle 1015 of the secure item retrieval device 1010. In some aspects, the graphical user interface 1035 may indicate to a recipient one or more types or forms of inputs or interactions that may be required to satisfy the predetermined conditions.

As a non-limiting illustrative example, the graphical user interface 1035 may direct the recipient to perform one or more swiping motions or similar gestures upon a touchscreen of the recipient computing device 1065, wherein successful performance of the motions or gestures may cause at least one coded signal to be transmitted from the recipient computing device 1065 to the controller of the secure item retrieval device 1010, which may cause the controller to at least temporarily alter an electronic mechanism from a locked state to an unlocked state.

In some non-limiting exemplary implementations, the securing mechanism 1020 may comprise one or more corresponding pairs of latches and latch receivers. In some aspects, one or more latches may be integrated with each door of the secure item retrieval device 1010, wherein each latch may be configured to be removably received by at least one latch receiver integrated within at least one portion of the secure item retrieval device 1010.

In some embodiments, at least one locking mechanism may maintain each latch within the corresponding latch receiver when the locking mechanism is in the locked state. In some aspects, each door 1025 may be configured with at least one spring-based mechanism, such that the door 1025 may move to an at least partially open position automatically via force provided by the spring when the locking mechanism is altered to the unlocked state, thereby allowing each relevant latch to be removed from its corresponding latch receiver. In some aspects, such configuration may increase the convenience of utilizing the secure item retrieval device 1010.

Figure 11A:
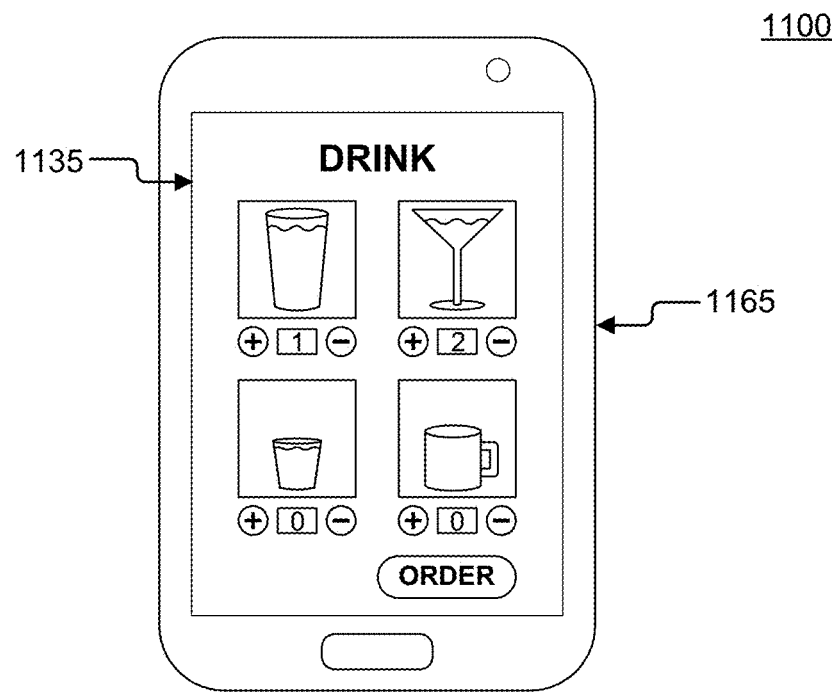
FIG. 11A illustrates an exemplary graphical user interface generated by a secure item retrieval system, according to some embodiments of the present disclosure.
Figure 11B:
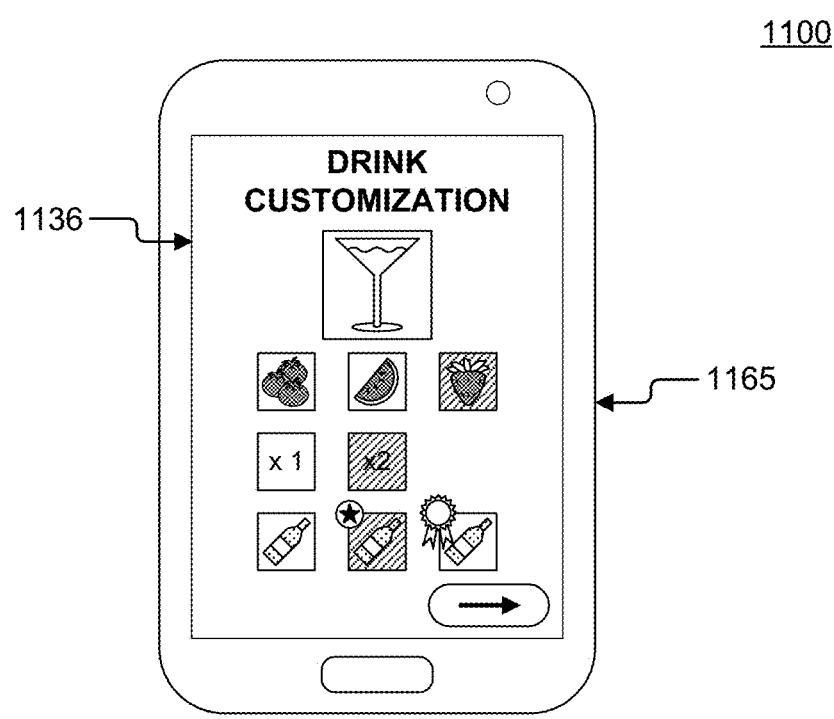
FIG. 11B illustrates an exemplary graphical user interface generated by a secure item retrieval system, according to some embodiments of the present disclosure.

Referring now to FIGS. 11A-B, exemplary graphical user interfaces 1135, 1136 generated by a secure item retrieval system 1100, according to some embodiments of the present disclosure, are illustrated. In some aspects, the secure item retrieval system 1100 may comprise at least one recipient computing device 1165, wherein the secure item retrieval system 1100 may comprise one or more coded software instructions or algorithms configured to generate and present one or more graphical user interfaces 1135, 1136 via the recipient computing device 1165.

In some implementations, the graphical user interfaces 1135, 1136 may allow a recipient to submit at least one order or request for one or more items or receive one or more notifications, such as, for example and not limitation, text messages, sounds, vibrations, images, or other notifications or alerts presented or generated by the recipient computing device 1165 that may indicate that the items are being prepared, who is preparing the items, or that the items are available and ready to be retrieved. In some aspects, one or more notifications may indicate an estimated time at which the items may be ready to be retrieved, as non-limiting examples. In some embodiments, an image of the items ready to be picked up within a receptacle of a secure item retrieval device may be captured by at least one camera or similar image capturing device and transmitted to the recipient with one or more notifications.

In some aspects, the graphical user interface 1135 may allow a recipient to search a map or list of nearby providers, which may be sorted, for example and not limitation, by proximity to the recipient, select a provider and view a menu or similar list of items available therefrom, and submit an order or request for one or more items from the selected provider.

By way of example and not limitation, the graphical user interface 1135 may allow a recipient to submit an order for one or more types of beverages, as well as submit an indication for a desired quantity of each requested beverage type, as non-limiting examples. In some implementations, the graphical user interface 1136 may allow the user to select one or more customizable options for the requested items. As a non-limiting illustrative example wherein a requested item may comprise at least one beverage, the recipient may be able to use the graphical user interface 1136 to indicate one or more desired flavors, pour sizes, ingredients, mixers, toppings, or similar features that may be relevant to the selected beverage, as non-limiting examples, and see pricing associated therewith.

Figure 12:
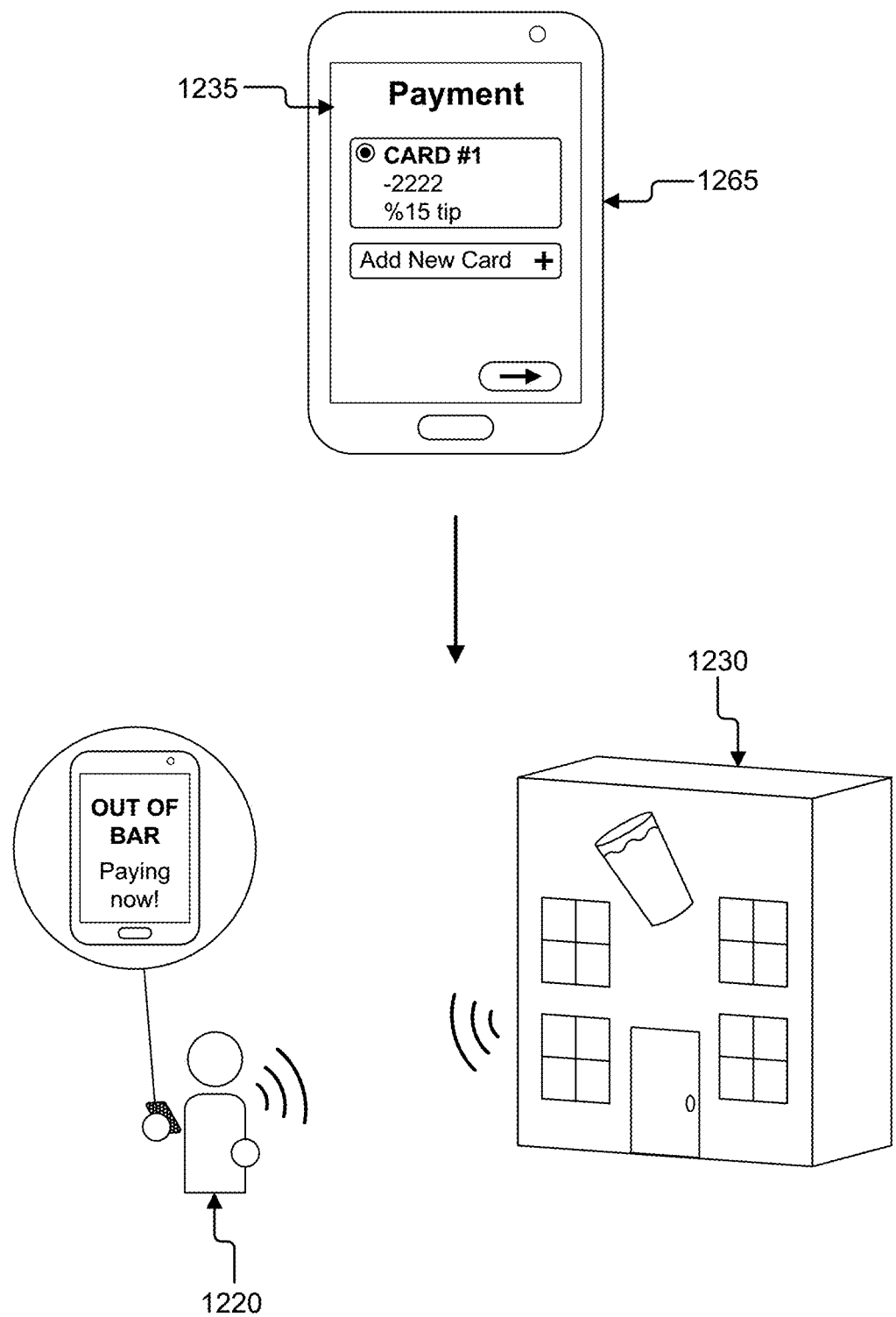
FIG. 12 illustrates an exemplary secure item retrieval system, according to some embodiments of the present disclosure.

Referring now to FIG. 12, an exemplary secure item retrieval system 1200, according to some embodiments of the present disclosure, is illustrated. In some aspects, the secure item retrieval system 1200 may comprise one or more coded software applications or algorithms that enable the secure item retrieval system 1200 to generate and present one or more graphical user interfaces 1235 via at least one recipient computing device 1265. In some implementations, the software instructions or algorithms of the secure item retrieval system 1200 may be configured to receive data from at least one Global Positioning System ("GPS") or similar geolocation sensor integrated or otherwise associated with the recipient computing device 1265 to determine a substantially real-time current location of the recipient computing device 1265.

In some aspects, the graphical user interface 1235 may be configured to facilitate payment for one or more items ordered or requested by at least one recipient 1220 from at least one provider 1230. In some implementations, the graphical user interface 1235 may allow the recipient 1220 to input one or more types of payment information, such as credit or debit card information, desired tip amount or percentage, and billing address, as non-limiting examples. In some embodiments, by submitting payment information via the graphical user interface 1235, only one payment transaction may need to be processed for the recipient 1220 when the recipient 1220 ultimately decides to stop submitting orders to the provider 1230 during a visit thereto.

In some aspects, this may decrease the cost and time that may be associated with completing multiple payment transactions between the recipient 1220 and the provider 1230, as non-limiting examples. In some embodiments, the secure item retrieval system 1200 may enable the provider 1230 to preauthorize payment from the recipient 1220 each time a new order is submitted, wherein an order may be denied if the preauthorization attempt fails, thereby providing financial security to the provider 1230.

In some non-limiting exemplary implementations, the secure item retrieval system 1200 may be configured to automatically process payment from the recipient 1220 for any items ordered upon the detection of one or more stimuli or events. In such implementations, the recipient 1220 may identify a default tip amount or percentage to be applied to such automated payment processing.

By way of example and not limitation, payment from the recipient 1220 may be automatically processed when the secure item retrieval system 1200 determines via one or more GPS or geolocation sensors associated with the recipient computing device 1265 that the recipient computing device 1265 has moved away from a predefined location. As a non-limiting illustrative example, payment from the recipient 1220 may be processed when the recipient computing device 1265 is more than 100 feet from at least one structure or boundary associated with the provider 1230, such as, for example and not limitation, a physical building where the business of the provider 1230 may be conducted.

By way of further example and not limitation, payment may be automatically processed from the recipient 1220 by the secure item retrieval system 1200 when the secure item retrieval system 1200 determines that the hours of operation of the provider 1230 have ended or when the recipient 1220 attempts to use the secure item retrieval system 1200 to submit an order or request for one or more items from a second provider 1230. In some non-limiting exemplary embodiments, a plurality of providers 1230 may allow the recipient 1220 to submit orders from other providers 1230 without automatically initiating payment from the recipient 1220, wherein such collaboration amongst the providers 1230 may encourage recipients 1220 to utilize the secure item retrieval system 1200 and may minimize transaction costs associated with processing multiple payments.

Figure 13A:
FIG. 13A illustrates an exemplary graphical user interface generated by a secure item retrieval system, according to some embodiments of the present disclosure.
Figure 13B:
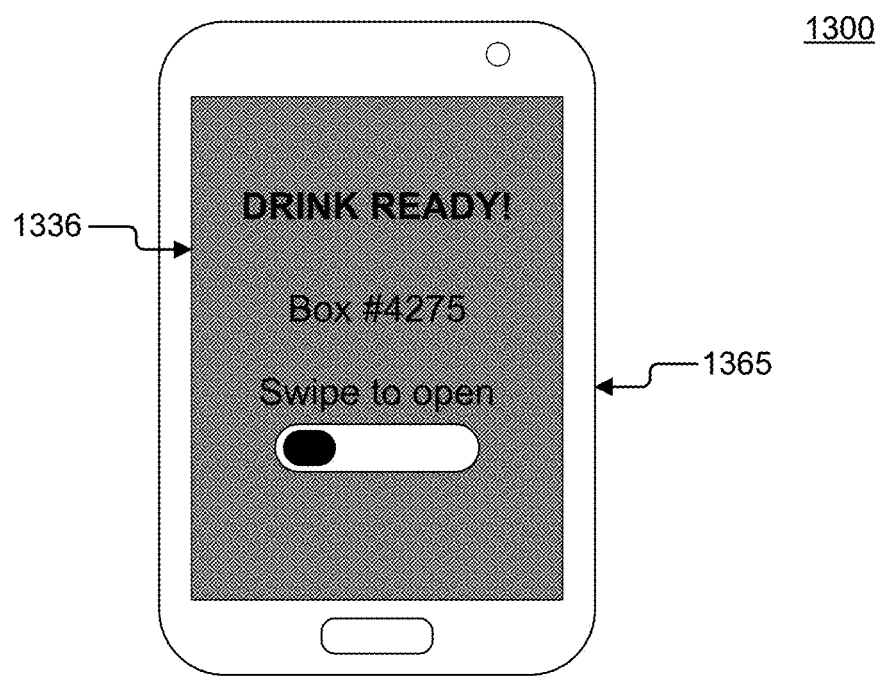
FIG. 13B illustrates an exemplary graphical user interface generated by a secure item retrieval system, according to some embodiments of the present disclosure.

Referring now to FIGS. 13A-B, exemplary graphical user interfaces 1335, 1336 generated by a secure item retrieval system 1300, according to some embodiments of the present disclosure, are illustrated. In some aspects, the secure item retrieval system 1300 may comprise one or more coded software instructions or algorithms configured to generate and present one or more graphical user interfaces 1335, 1336 via a recipient computing device 1365. In some implementations, the graphical user interfaces 1335, 1336 may allow a recipient to receive one or more notifications, such as, for example and not limitation, text messages, sounds, vibrations, images, or other notifications or alerts presented or generated by the recipient computing device 1365 that may indicate that one or more ordered or requested items are available and ready to be retrieved.

In some aspects, the graphical user interface 1335 may be generated and presented to a recipient via a recipient computing device 1365 to indicate to the recipient that one or more ordered items are ready to be retrieved, as well as one or more of: a receptacle identification, receptacle access code, and receptacle color to inform the recipient which receptacle contains the requested items as well as how to access the relevant receptacle. In some implementations, the presented receptacle identification may comprise one or more alphanumeric characters that may correspond to characters displayed on an exterior portion of the relevant receptacle.

In some embodiments, the presented receptacle color may correspond to a color of one or more illuminated lights configured within and/or upon the relevant receptacle, which may make the receptacle easier to find, such as in aspects wherein a provider venue may be crowded or dark. In some aspects, the presented receptacle access code may comprise one or more alphanumeric characters that may be entered via the recipient computing device 1365 or via an input device associated with the receptacle that may cause at least one coded signal to be sent to at least one controller that may cause the controller to at least temporarily alter at least one locking mechanism associated with at least one door of the relevant receptacle to be altered to an unlocked state, thereby allowing the door to be moved to an at least partially open position, thereby allowing the items therein to be retrieved by the recipient.

In some implementations, the graphical user interface 1336 may be generated and presented to a recipient via a recipient computing device 1365 to indicate to the recipient that one or more ordered items are ready to be retrieved. In some aspects, the graphical user interface 1336 may present the recipient with one or more required inputs that may need to be received by the secure item retrieval system 1300 to grant the recipient at least temporary authorization to access the interior portion of a receptacle that contains the ordered items.

By way of example and not limitation, the graphical user interface 1336 may present the recipient with one or more required gestures or motions, such as, for example and not limitation, swiping and/or tapping motions that may be received via a touchscreen associated with the recipient computing device 1365, wherein upon receiving the required inputs, at least one coded signal may be sent to a controller associated with the relevant receptacle to at least temporarily alter at least one locking mechanism associated with at least one door of the receptacle to be altered to an unlocked state, thereby allowing the door to be moved to an at least partially open position, allowing the items therein to be retrieved by the recipient.

Figure 14:
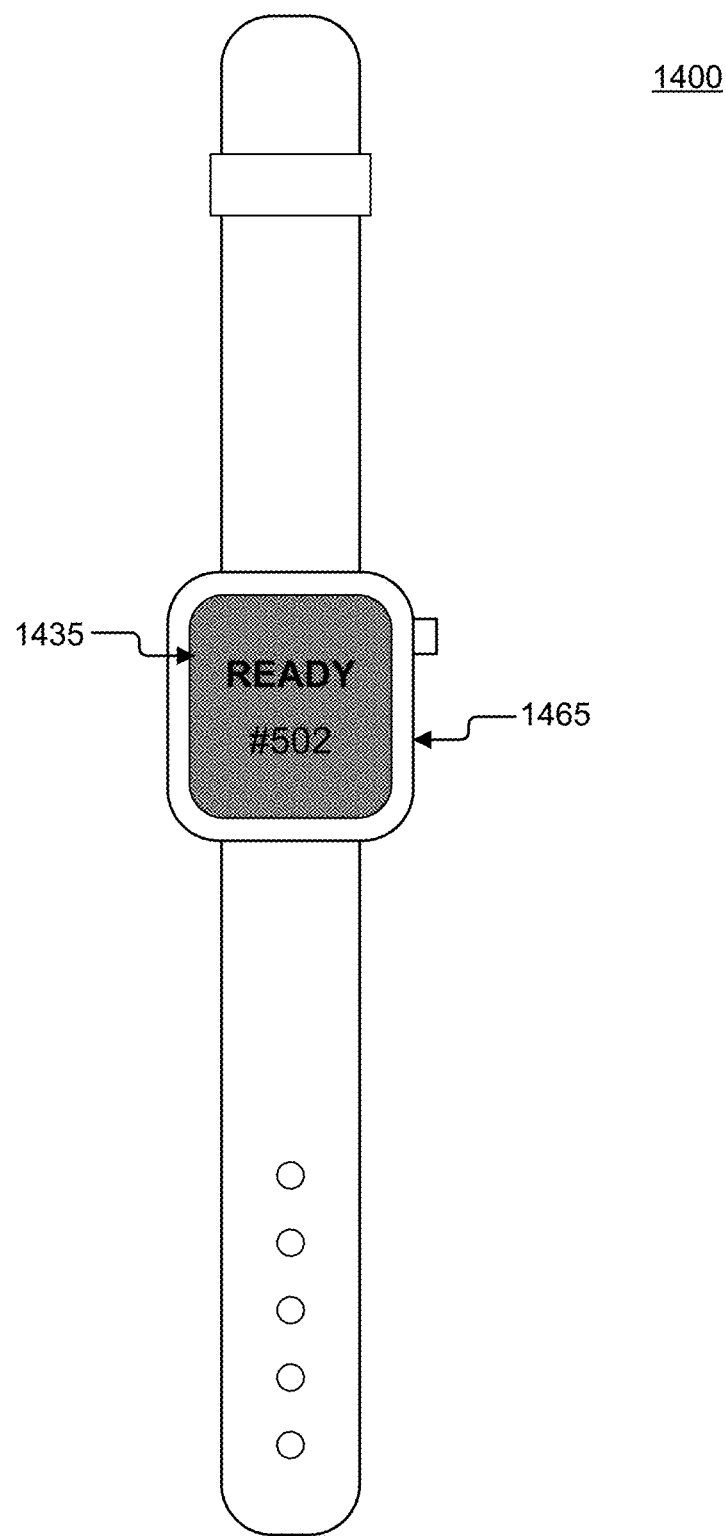
FIG. 14 illustrates an exemplary graphical user interface generated by a secure item retrieval system, according to some embodiments of the present disclosure.

Referring now to FIG. 14, an exemplary graphical user interface 1435 generated by a secure item retrieval system 1400, according to some embodiments of the present disclosure, is illustrated. In some aspects, the secure item retrieval system 1400 may comprise one or more coded software instructions or algorithms configured to generate and present one or more graphical user interfaces 1435 via a recipient computing device 1465 in the form of a wearable technology device, such as, for example and not limitation, a smartwatch.

In some implementations, the graphical user interface 1435 may allow a recipient to receive one or more notifications, such as, for example and not limitation, text messages, sounds, vibrations, images, or other notifications or alerts presented or generated by the secure item retrieval system 1400 via the recipient computing device 1465 that may indicate that one or more ordered or requested items are available and ready to be retrieved.

Figure 15:
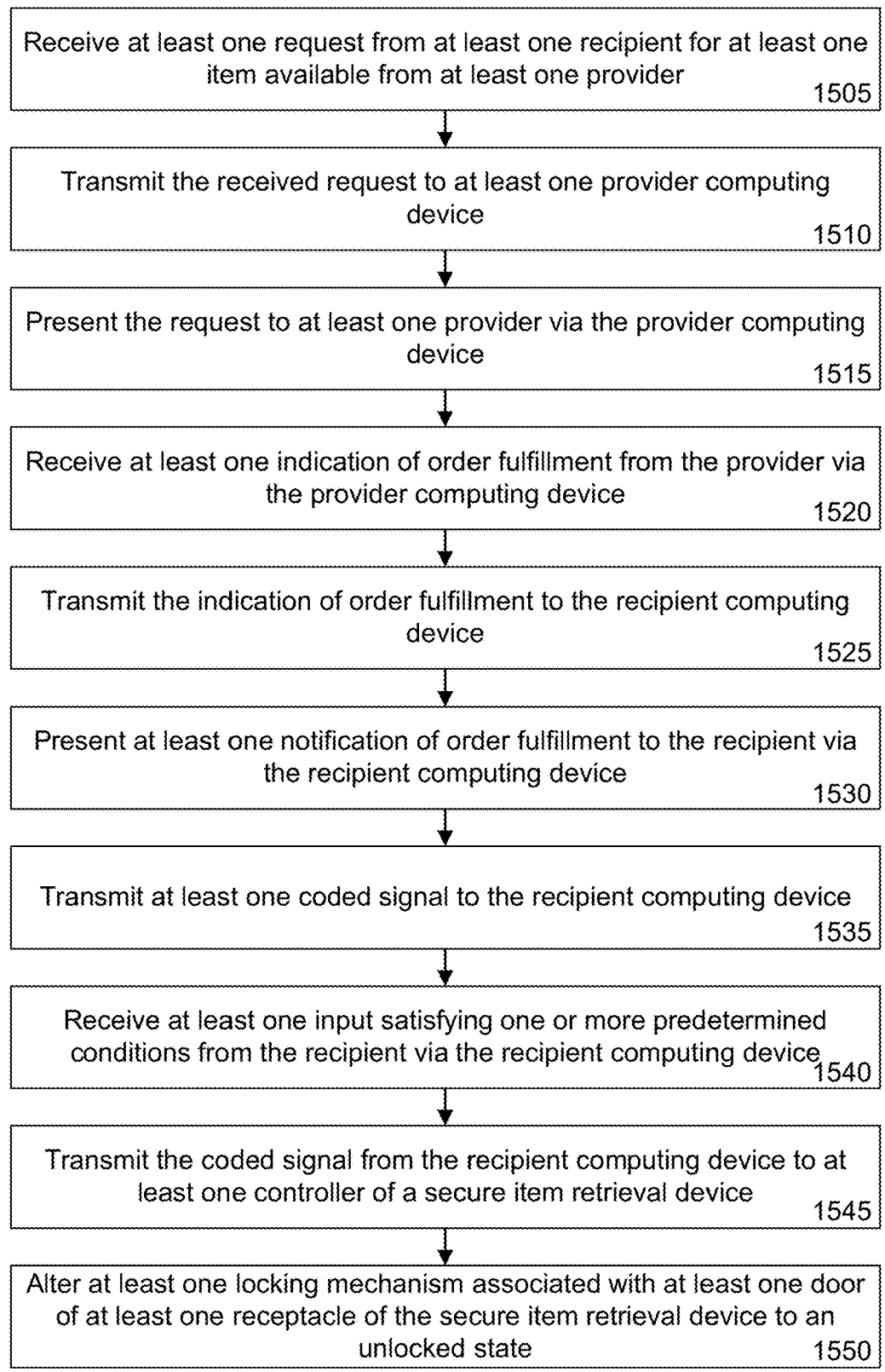
FIG. 15 illustrates exemplary method steps for a process for facilitating secure item retrieval, according to some embodiments of the present disclosure.

Referring now to FIG. 15, exemplary method steps for a process 1500 for facilitating secure item retrieval, according to some embodiments of the present disclosure, are illustrated. In some aspects, process 1500 may be at least partially executed via a secure item retrieval system that comprises at least one recipient computing device communicatively coupled to at least one provider computing device via one or more servers, as well as at least one secure item retrieval device, wherein the secure item retrieval device comprises at least one receptacle, wherein the receptacle comprises a first at least one opening and a second at least one opening, wherein the first and the second at least one opening are configured to be physically blocked by a first door and a second door, respectively, when the first and second doors are in a closed position.

In some aspects, at 1505, at least one request may be received from at least one recipient for at least one item available from at least one provider. In some embodiments, the request may be facilitated by one or more inputs received via at least one recipient computing device.

In some implementations, at 1510, the request received from the recipient may be transmitted to at least one provider computing device via one or more servers, wherein the recipient computing device, the provider computing device, and the servers may be communicatively coupled via at least one network connection.

In some embodiments, at 1515, the transmitted request may be presented to at least one provider via at least one display screen or similar mechanism integrated with or communicatively coupled to the provider computing device. In some aspects, an exterior portion of the provider computing device may comprise one or more lighting elements that may be configured to become illuminated when an order request is received.

In some implementations, at 1520, at least one indication of request fulfillment may be received via at least one input device integrated with or communicatively coupled to the provider computing device from the provider. In some embodiments, the provider may use a touchscreen or similar input device associated with the provider computing device to indicate that a requested order is ready to be picked up after preparing one or more requested items and placing the items within the interior portion of at least one receptacle of a secure item retrieval device.

In some aspects, at 1525, the indication of request fulfillment may be transmitted to the recipient computing device via the servers. In some embodiments, at 1530, the indication of request fulfillment may be presented to the recipient via a display screen or similar mechanism associated with the recipient computing device, wherein the indication may be presented as a notification that informs the recipient of where the requested item(s) may be retrieved and how to access the receptacle(s) that contain the items.

In some implementations, at 1535, at least one coded signal or at least one instructional datum for generating at least one coded signal may be transmitted to the recipient computing device, wherein the coded signal may be configured to be transmitted from the recipient computing device to at least one controller of the secure item retrieval device when one or more required inputs are received via at least one input device integrated with or communicatively coupled to the recipient computing device.

In some aspects, at 1540, at least one required input may be received from the recipient via the recipient computing device. By way of example and not limitation, the required input may comprise one or more of: a facial recognition scan, an alphanumeric passcode, a fingerprint scan, a voice sample, a retinal scan, or any other authorization verification techniques.

In some implementations, at 1545, the coded signal may be transmitted from the recipient computing device to the controller of the secure item retrieval device. In some aspects, at 1550, upon receiving the coded signal, the controller of the secure item retrieval device may at least temporarily alter at least one locking mechanism associated with at least one door of the receptacle(s) containing the ordered items to an unlocked state.

Figure 16:
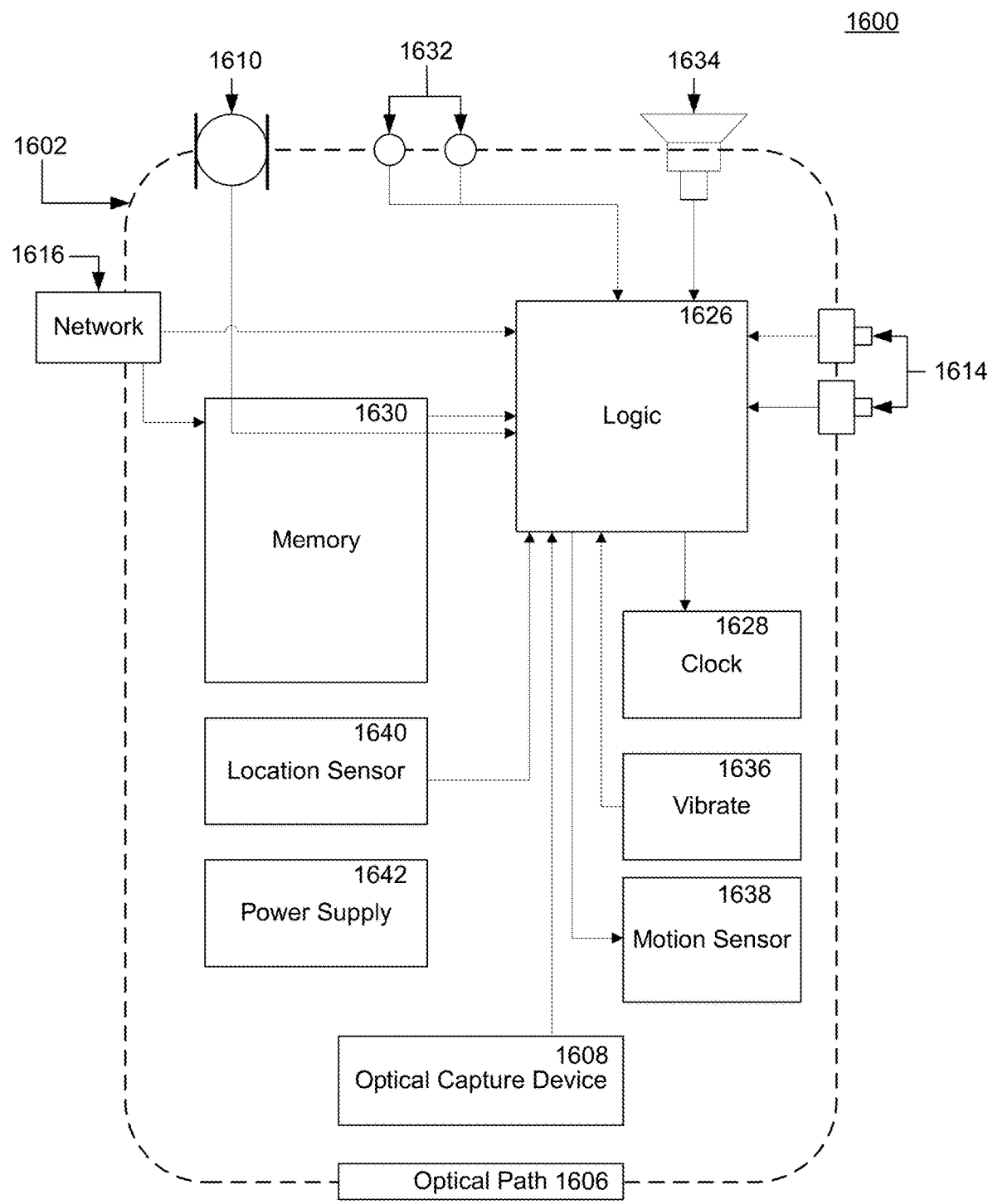
FIG. 16 illustrates a block diagram of an exemplary computing device that may be utilized within a secure item retrieval system, according to some embodiments of the present disclosure.

Referring now to FIG. 16, a block diagram of an exemplary embodiment of a computing device 1602 that may be utilized within a secure item retrieval system, according to some embodiments of the present disclosure, is illustrated.

In some aspects, the computing device 1602 may comprise an optical capture device 1608, which may capture an image and convert it to machine-compatible data, and an optical path 1606, typically a lens, an aperture, or an image conduit to convey the image from a rendered document to the optical capture device 1608. The optical capture device 1608 may incorporate a Charge-Coupled Device (CCD), a Complementary Metal Oxide Semiconductor (CMOS) imaging device, or an optical sensor of another type.

In some embodiments, the computing device 1602 may comprise a microphone 1610, wherein the microphone 1610 and associated circuitry may convert the sound of the environment, including spoken words, into machine-compatible signals. Input facilities 1614 may exist in the form of buttons, scroll-wheels, or other tactile sensors such as touch-pads. In some embodiments, input facilities 1614 may include a touchscreen display. Visual feedback 1632 to the user may occur through a visual display, touchscreen display, or indicator lights. Audible feedback 1634 may be transmitted through a loudspeaker or other audio transducer. Tactile feedback may be provided through a vibration module 1636.

In some aspects, the computing device 1602 may comprise a motion sensor 1638, wherein the motion sensor 1638 and associated circuitry may convert the motion of the computing device 1602 into machine-compatible signals. For example, the motion sensor 1638 may comprise an accelerometer, which may be used to sense measurable physical acceleration, orientation, vibration, and other movements. In some embodiments, the motion sensor 1638 may comprise a gyroscope or other device to sense different motions.

In some implementations, the computing device 1602 may comprise a location sensor 1640, wherein the location sensor 1640 and associated circuitry may be used to determine the location of the device 1602. The location sensor 1640 may detect Global Position System (GPS) radio signals from satellites or may also use assisted GPS where the computing device 1602 may use a cellular network to decrease the time necessary to determine location. In some embodiments, the location sensor 1640 may use radio waves to determine the distance from known radio sources such as cellular towers to determine the location of the computing device 1602. In some embodiments these radio signals may be used in addition to and/or in conjunction with GPS.

In some aspects, the computing device 1602 may comprise a logic module 1626, which may place the components of the computing device 1602 into electrical and logical communication. The electrical and logical communication may allow the components to interact. Accordingly, in some embodiments, the received signals from the components may be processed into different formats and/or interpretations to allow for the logical communication.

The logic module 1626 may be operable to read and write data and program instructions stored in associated storage 1630, such as RAM, ROM, flash, or other suitable memory. In some aspects, the logic module 1626 may read a time signal from the clock unit 1628. In some embodiments, the computing device 1602 may comprise an on-board power supply 1642. In some embodiments, the computing device 1602 may be powered from a tethered connection to another device, such as a Universal Serial Bus (USB) connection.

In some implementations, the computing device 1602 may comprise a network interface 1616, which may allow the computing device 1602 to communicate and/or receive data to a network and/or an associated computing device. The network interface 1616 may provide two-way data communication.

For example, the network interface 1616 may operate according to an internet protocol. As another example, the network interface 1616 may comprise a local area network (LAN) card, which may allow a data communication connection to a compatible LAN. As another example, the network interface 1616 may comprise a cellular antenna and associated circuitry, which may allow the computing device 1602 to communicate over standard wireless data communication networks. In some implementations, the network interface 1616 may comprise a Universal Serial Bus (USB) to supply power or transmit data. In some embodiments, other wireless links known to those skilled in the art may also be implemented.

Figure 17A:
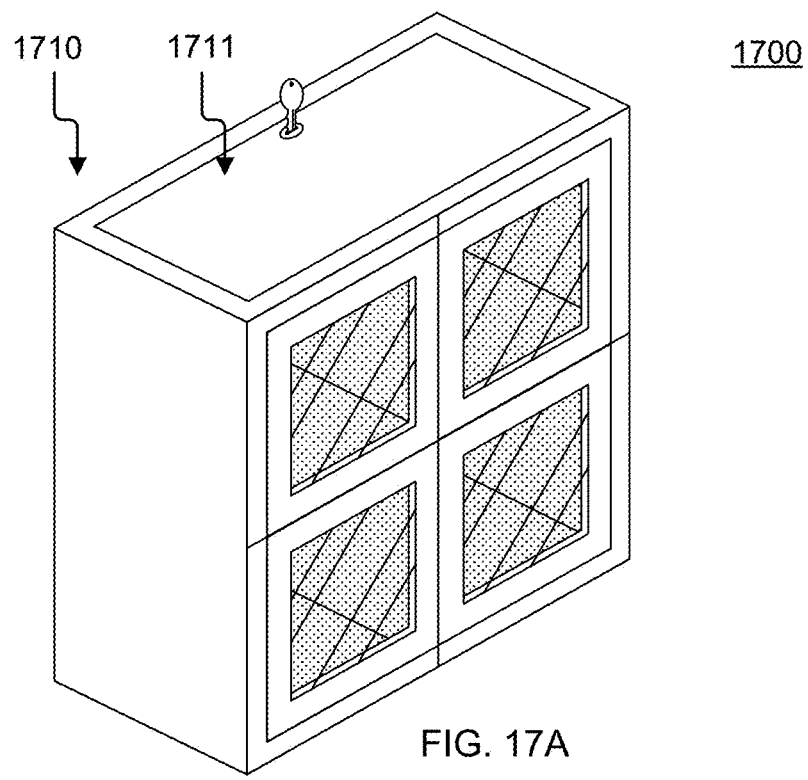
FIG. 17A illustrates an exemplary secure item retrieval device, according to some embodiments of the present disclosure.
Figure 17B:
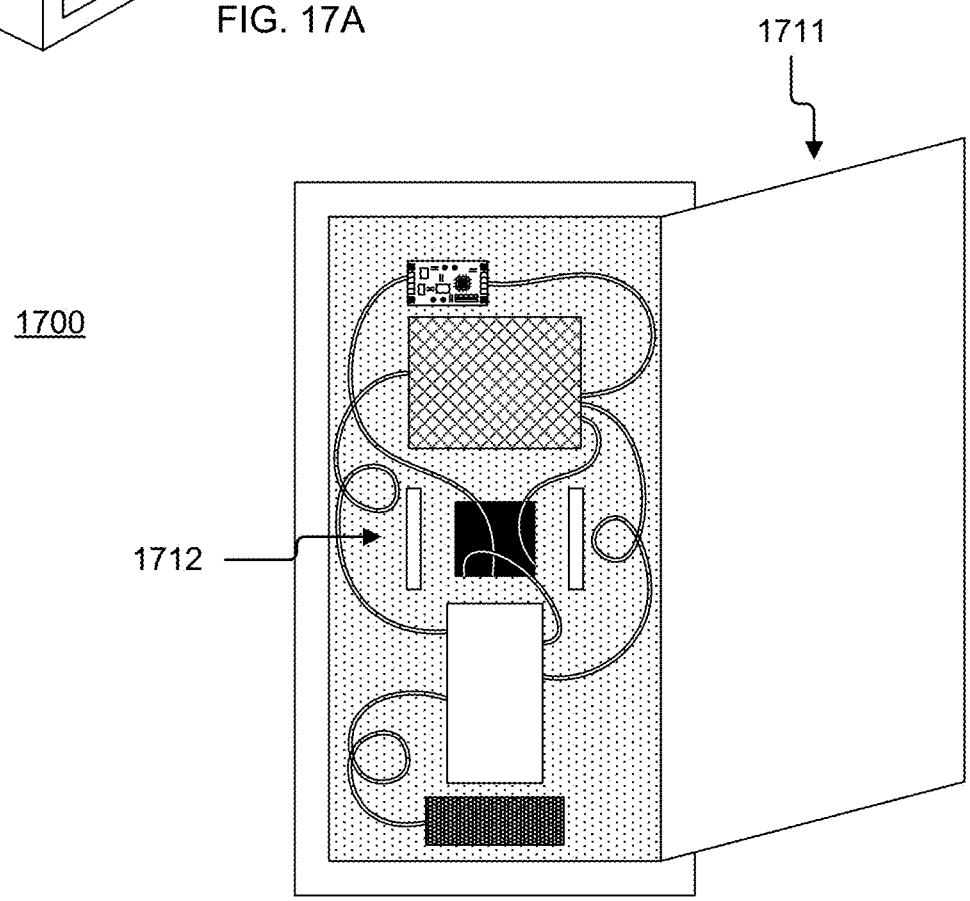
FIG. 17B illustrates an exemplary secure item retrieval device, according to some embodiments of the present disclosure.

Referring now to FIGS. 17A-B, an exemplary secure item retrieval system 1700 is illustrated, according to some embodiments of the present disclosure. In some implementations, the secure item retrieval system 1700 may comprise at least one secure item retrieval device 1710. In some aspects, the secure item retrieval device 1710 may comprise an access panel 1711 that may provide access to one or more receptacles within the secure item retrieval device 1710. In some implementations, the access panel 1711 may be locked, such as with a key, keypad, or electronic latching mechanism, as non-limiting examples. In some embodiments, when the access panel 1711 is unlocked, the access panel 1711 may be alterable between an open position and a closed position, wherein configuring the access panel 1711 in an at least partially open position may facilitate user access to at least one manual release mechanism 1712, such as, for example and not limitation, a lever, switch, tab, or knob, that, when engaged, may physically cause one or more doors associated with one or more receptacles to be altered to an at least partially open position. In some implementations, this manual door release may allow for effective and efficient maintenance of the receptacles, or for quick access to the interior portions of the receptacles if one or more electronic locking mechanisms associated therewith fail. In some embodiments, the access panel 1711 may obscure one or more electronic components and communication components of the secure item retrieval device 1710 when in the closed position, allowing for easy access to the components by altering the access panel 1711 to the open position and providing a cleaner aesthetic and more durable configuration than if the components were to be continuously exposed.

Figure 18:
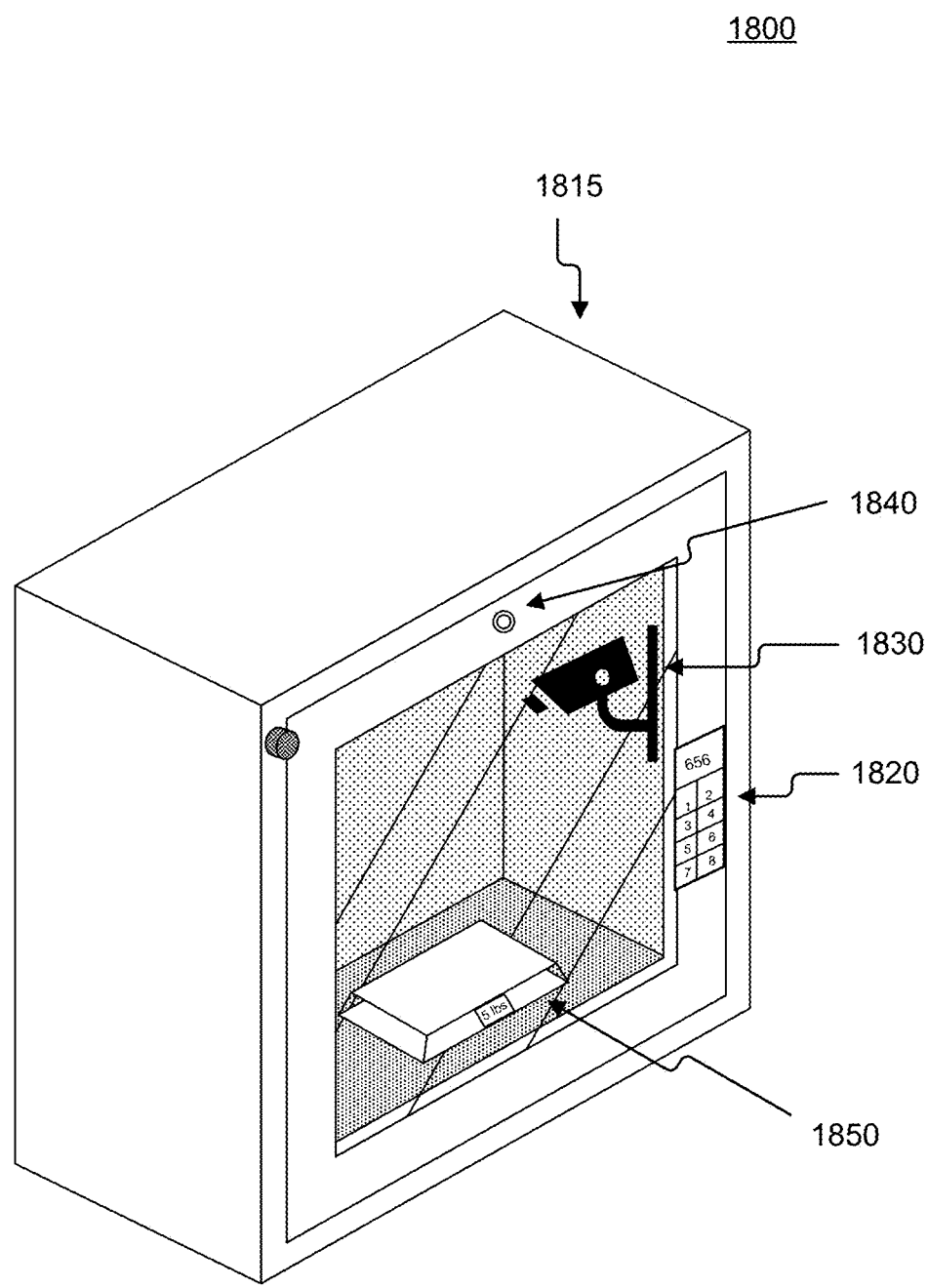
FIG. 18 illustrates an exemplary secure item retrieval device, according to some embodiments of the present disclosure.

Referring now to FIG. 18, an exemplary secure item retrieval system 1800 is illustrated, according to some embodiments of the present disclosure. In some aspects, the secure item retrieval system 1800 may comprise a standalone receptacle 1815. In some embodiments, a standalone receptacle 1815 may allow for single user deliveries, such as where customer and order flow may be lower. In some implementations, a plurality of standalone receptacles 1815 may be spread throughout a wall, room, or building, allowing more distance between customers as they pick up their orders. In some aspects, the spacing may allow for a specific aesthetic, which may be preferable in some establishments or use implementations. In some embodiments, the spacing may increase privacy, which may be preferable for high end establishments, assisted living facilities, or pharmacies. By way of example and not limitation, the spacing may decrease risk of cross contamination between customers, which may be helpful in pharmacies where customers may be sick when they pick up their orders.

As a non-limiting illustrative example, one or more standalone receptacles 1815 may be configured in an assisted living facility, retirement home, or nursing home. In some aspects, each resident of the assisted living facility, retirement home, or nursing home may be assigned a unique receptacle 1815. In some embodiments, a resident may input or enter one or more of: a facial recognition scan, an alphanumeric passcode, a fingerprint scan, a voice sample, a retinal scan, or any other authorization verification input via at least one input device 1820 or recipient computing device integrated with or communicatively coupled to the receptacle 1815, wherein successful entry of at least one expected input may cause at least one controller of the receptacle 1815 to alter one or more electronic locking mechanisms to an unlocked state to allow a door to be altered to an at least partially open position to allow access to an interior portion of the receptacle 1815.

In some implementations, at least one interior or exterior portion of the receptacle 1815 may comprise at least one visual capture device, such as, for example and not limitation, a camera. In some non-limiting exemplary embodiments, the controller of the receptacle 1815 may be configured to instruct the interior visual capture device 1830 to become activated and record video footage of any interaction with the interior portion of the receptacle 1815, including any item(s) therein, any time the locking mechanism is altered to the unlocked state until the door is ultimately closed again, wherein the recorded video may be at least temporarily stored within at least one database or similar storage medium. In some implementations, this may help ensure that the intended recipient of the item(s) within the receptacle 1815 received such item(s), which may be important, for example and not limitation, when the item(s) contain medication or other medical supplies. In some non-limiting exemplary embodiments, the controller of the receptacle 1815 may be configured to instruct the exterior visual capture device 1840 to become activated or record video footage of any interaction with the exterior of the receptable 1815, including the withdrawal or deposit of any item(s).

In some aspects, an interior portion, such as, for example and not limitation, a bottom portion of the receptacle 1815 may comprise at least one weight or mass detection device 1850, such as, for example and not limitation, an electronic or spring-based scale or a presence or occupancy sensor. In some embodiments, this may allow one or more remote users to use one or more computing devices communicatively coupled to the controller of the receptacle 1815 to receive a determination or indication of whether the receptacle 1815 currently comprises any items. In some aspects, this may provide reassurance or confirmation to one or more family members, caregivers, or loved ones as to whether a resident of a nursing home, retirement home, or assisted living facility is routinely receiving medication at scheduled times, or whether the resident may need assistance in obtaining the medication, as non-limiting examples.

Figure 19:
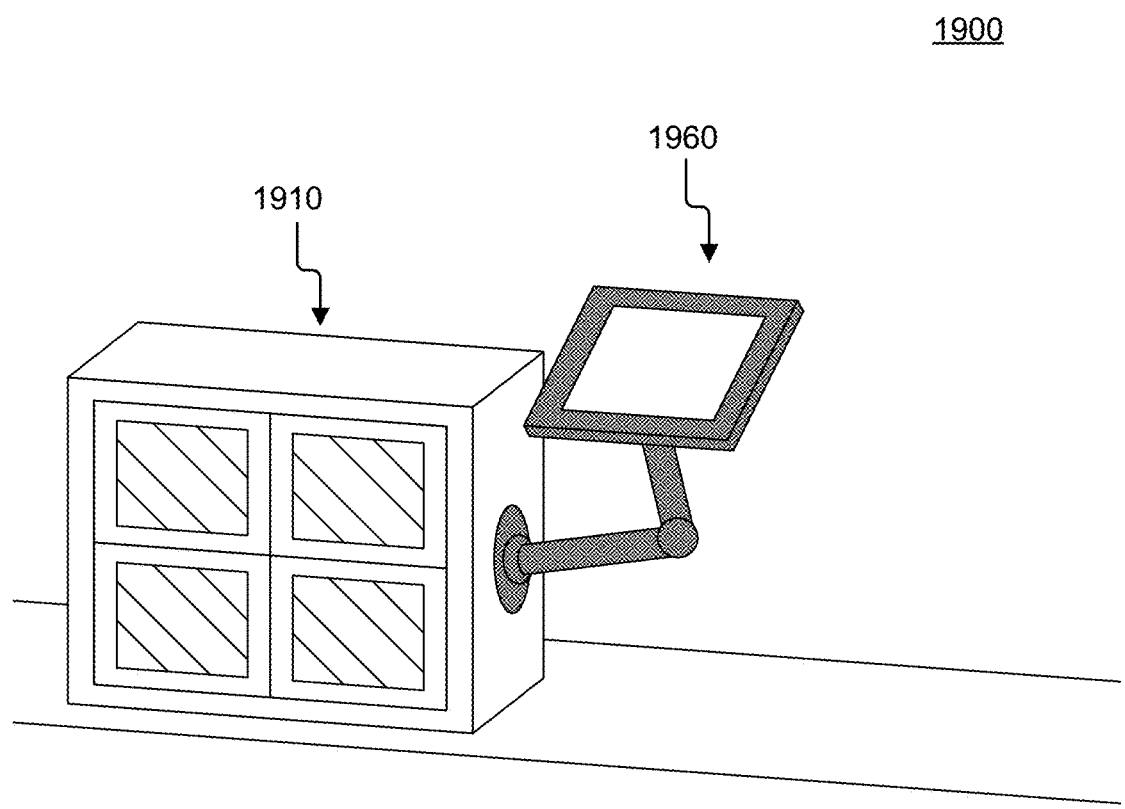
FIG. 19 illustrates an exemplary secure item retrieval device, according to some embodiments of the present disclosure.

Referring now to FIG. 19, an exemplary secure item retrieval system 1900 is illustrated, according to some embodiments of the present disclosure. In some implementations, a secure item retrieval device 1910 may comprise a provider computing device 1960 that may be directly attached to the secure item retrieval device 1910. The attachment may allow for one or more types of attachments, such as communication connection, physical connection, or electric connections, as non-limiting examples. In some aspects, an attachment comprising a physical connection may comprise a movable, pivotable, rotatable, and/or articulating arm, as non-limiting examples. In some embodiments, the provider computing device 1960 may be hardwired to the secure item retrieval device 1910, which may allow for a closed-circuit or closed-network control system. In some implementations, the provider computing device 1960 may integrate directly or indirectly with an establishment's point of sale system.

Figure 20:
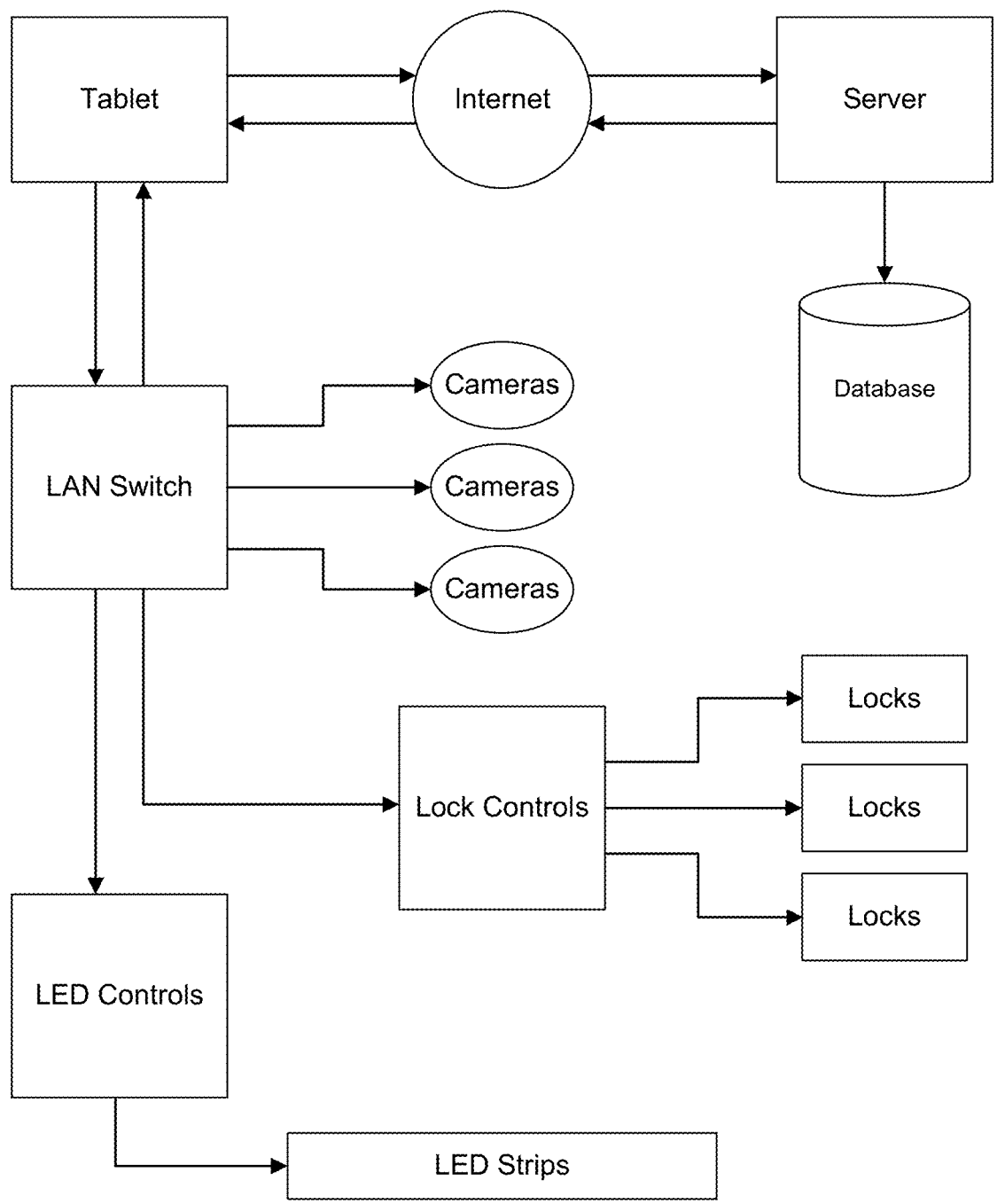
FIG. 20 illustrates an exemplary communications flow for a secure item retrieval system, according to some embodiments to the present disclosure.

FIG. 20 illustrates an exemplary communications flow 2000 for a secure item retrieval system, according to some embodiments to the present disclosure. In some aspects, data may be exchanged between an external database and a provider computing device, such as through a server and communications system. In some embodiments, the communications system may be at least partially hardwired between the provider computing device and the server. In some implementations, at least a portion of the communication may occur wirelessly.

In some embodiments, the provider computing device may communicate with a LAN switch that may allow for control of at least one secure item retrieval system or device. In some implementations, the LAN switch may control one or more cameras, locks, or lighting, as non-limiting examples. The LAN switch may control at least one internal camera, such as to detect the presence or contents of an order, at least one external camera, such as to detect a consumer attempting to open a receptacle, or a combination of both. In some implementations, the LAN switch may control one or more locks, such as for an access panel, back delivery panel, or front collection panel. In some aspects, the LAN switch may control lighting, such as colors and illumination of one or more receptacles.

Figure 21:
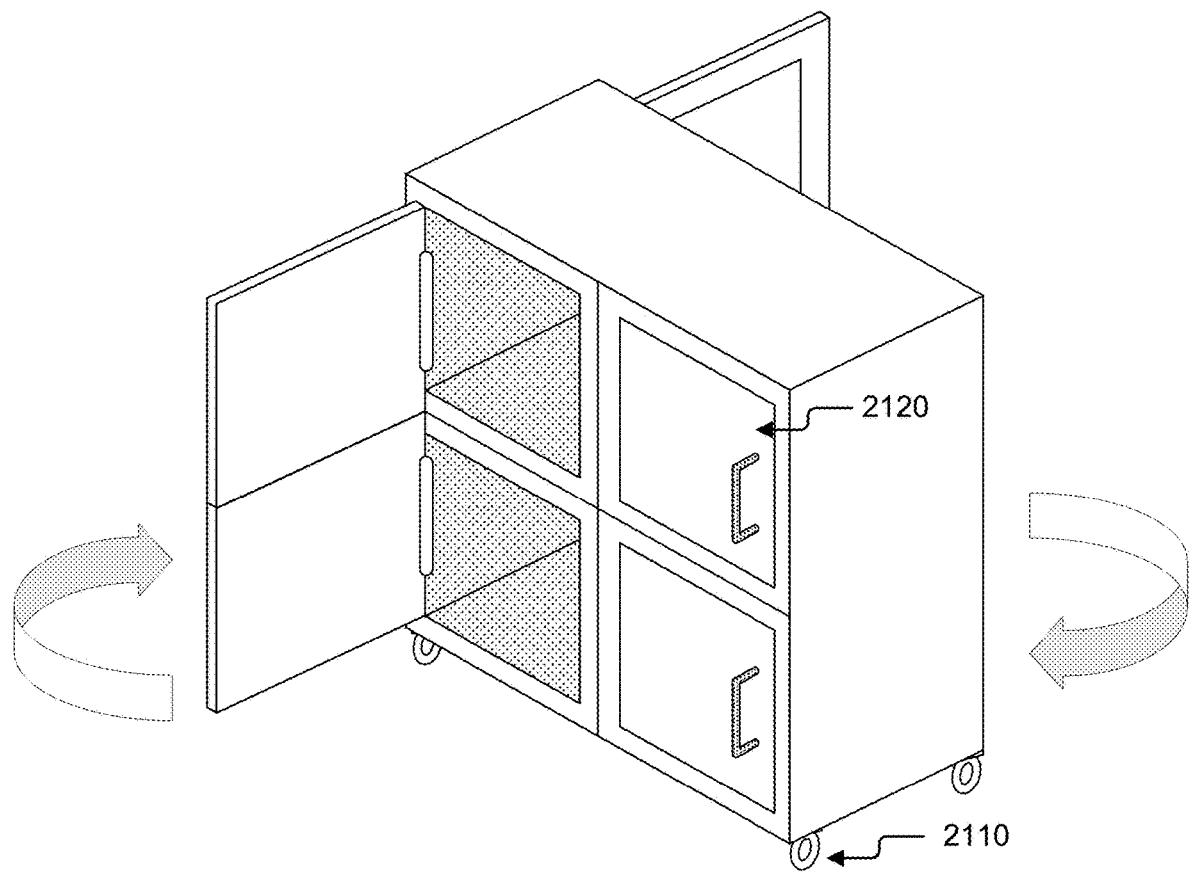
FIG. 21 illustrates an exemplary secure item retrieval device, according to some embodiments of the present disclosure.

Referring now to FIG. 21, an exemplary secure item retrieval device 2100 according to some embodiments of the present disclosure is illustrated. In some embodiments, the secure item retrieval device may include at least one wheel 2110. In some implementations, the at least one wheel 2110 may allow at least one provider to freely move the secure item retrieval device 2100 by pushing or pulling. In some aspects, the at least one wheel 2110 may include a locking mechanism, wherein the locking mechanism may be configured to be altered between a locked state and an unlocked state, wherein placing the at least one wheel 2110 in the locked state may temporarily inhibit movement of the secure item retrieval device 2100. As a non-limiting example, the at least one wheel 2110 may be connected to at least a portion of the secure item retrieval device 2100 by at least one attachment mechanism, such as, for example and not limitation, at least one screw.

In some embodiments, the at least one wheel 2110 may be removable, wherein the attachment mechanism of the at least one wheel 2110 may be coupled with the secure item retrieval device 2100, wherein the attachment mechanism may comprise a click-lock system. By way of example and not limitation, the at least one wheel 2110 may be removed from the secure item retrieval device 2100, wherein the secure item retrieval device may become stationary until the at least one wheel 2110 is reattached. In some aspects, the at least one wheel 2110 may be replaceable, wherein new wheels may be supplemented when the older wheels have become used and worn. In some implementations, the at least one wheel 2110 may make the secure item retrieval device 2100 suitable for venues or events with large crowds, such as music festivals, concerts, or sporting events, as non-limiting examples.

In some embodiments, the secure item retrieval device 2100 may include at least one door 2120, wherein the door may be opaque or solid. As a non-limiting example, the opaque or solid at least one door 2120 may be configured to provide block vision of the internal cavity of the secure item retrieval device 2100. In some aspects, the contents of the secure item retrieval device 2100 may only be accessible and viewable once the opaque or solid at least one door 2120 opens.

Figure 22:
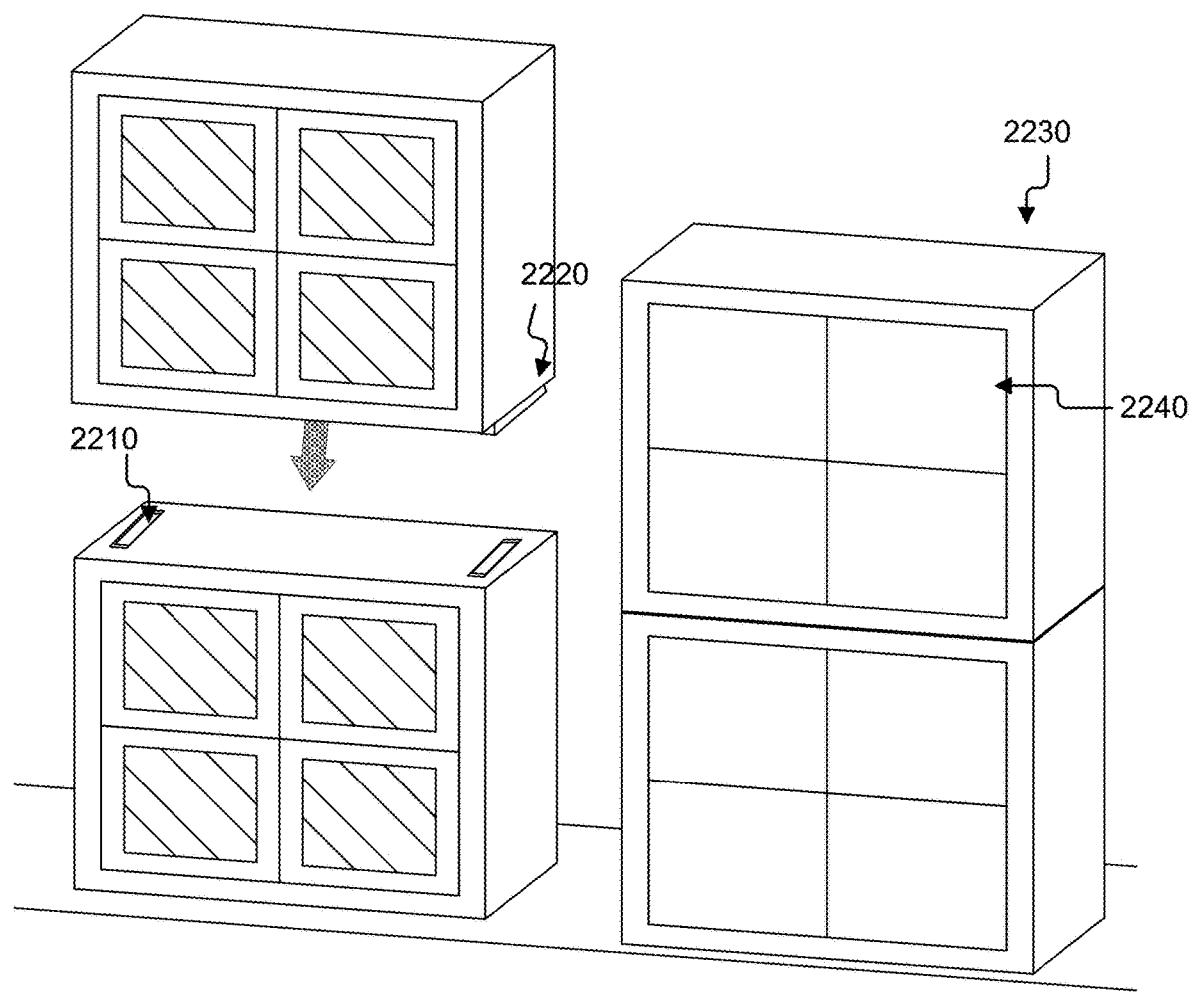
FIG. 22 illustrates an exemplary secure item retrieval device, according to some embodiments of the present disclosure.

Referring now to FIG. 22, an exemplary secure item retrieval device 2200 according to some embodiments of the present disclosure, is illustrated. In some embodiments, the secure item retrieval device may include at least receptacle 2230. In some aspects, the at least receptacle 2230 may include a top securing mechanism 2210 and a bottom securing mechanism 2220, wherein the bottom securing mechanism 2220 may be coupled to the top securing mechanism 2210 to connect at least one receptacle 2230 to at least one other receptacle 2230. By way of example and not limitation, the top securing mechanism 2210 and bottom securing mechanism 2220 may include a locking mechanism, wherein the locking mechanism may be configured to be altered between a locked state and an unlocked state, wherein placing the locking mechanism in the locked state may temporarily inhibit movement of the at least one receptacle 2230.

In some embodiments, the secure item retrieval device 2200 may include receptacles 2230 that may be connected to one another via the coupling of the top securing mechanism 2210 and the bottom securing mechanism 2220. In some aspects, one receptacle 2230 may be detached from another receptacle 2230 to facilitate feasible travel of the secure item retrieval device 2200. In some implementations, the top securing mechanism 2210 and bottom securing mechanism 2220 may make the secure item retrieval device 2200 more suitable for venues or events with large crowds, such as music festivals, concerts, or sporting events, as non-limiting examples.

In some embodiments, the secure item retrieval device 2200 may include an opaque or solid at least one door 2240. As a non-limiting example, the opaque or solid at least one door 2240 may be configured to provide block vision of the internal cavity of the secure item retrieval device 2200. In some aspects, the contents of the secure item retrieval device 2200 may only be accessible and viewable once the opaque or solid at least one door 2240 opens.

Figure 23:
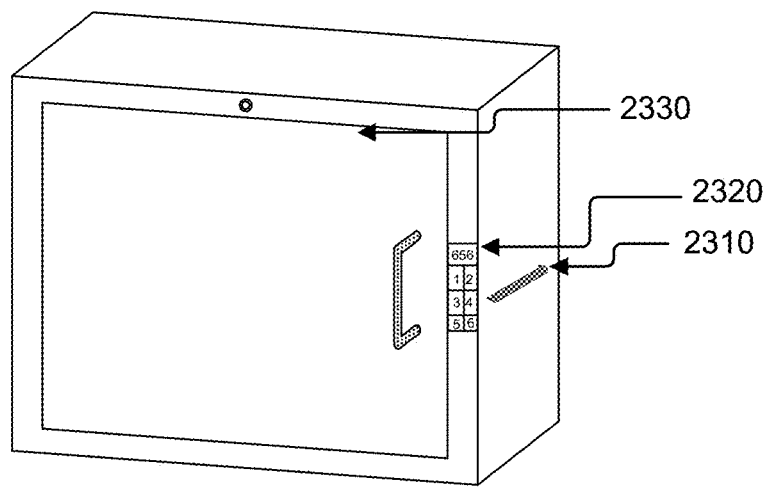
FIG. 23 illustrates an exemplary secure item retrieval device, according to some embodiments of the present disclosure.

Referring now to FIG. 23, an exemplary secure item retrieval device 2300 according to some embodiments of the present disclosure, is illustrated. In some embodiments, the secure item retrieval device 2300 may include handles 2310, wherein a handle 2310 may be positioned at two points on the sidewall of the secure item retrieval device 2300. In some aspects, the handles 2310 may be surrounded by rubber to facilitate easier gripping of secure item retrieval device 2300. In some implementations, the handles 2310 may be attached to the secure item retrieval device 2300 by bands made of rope, chains, rubber, or metal, as non-limiting examples.

In some embodiments, the handles 2310 may be removable from the secure item retrievable device 2300, wherein the handles 2310 may be attached and detached. In some aspects, the handles 2310 may make the secure item retrievable device 2300 more suitable for venues or events with large crowds, such as music festivals, concerts, or sporting events, as non-limiting examples. In some implementations, the handles 2310 may include finger-sized indents, wherein a provider's hand may fit more securely to facilitate a better grip of the secure item retrieval device 2300.

In some embodiments, the secure item retrieval device 2300 may include an input device 2320. By way of example and not limitation, the input device 2320 may include a facial recognition scan, an alphanumeric passcode, a fingerprint scan, a voice sample, a retinal scan, or any other authorization verification. In some implementations, the input device 2320 may allow a successful entry of at least one expected input to cause at least one controller of the receptacle to alter one or more electronic locking mechanisms to an unlocked state to allow a door to be altered to an at least partially open position to allow access to an interior portion of the receptacle. In some embodiments, the secure item retrieval device 2300 may include an external video capture device 2330. In some aspects, the external video capture device 2330 may be configured to record interactions with the secure item retrieval device 2300. In some implementations, the external video capture device 2330 may be configured to coordinate activity with the input device 2320, wherein the video capture device 2330 may be configured to authenticate an individuals identification to prompt the opening of the receptable.

Figure 24:
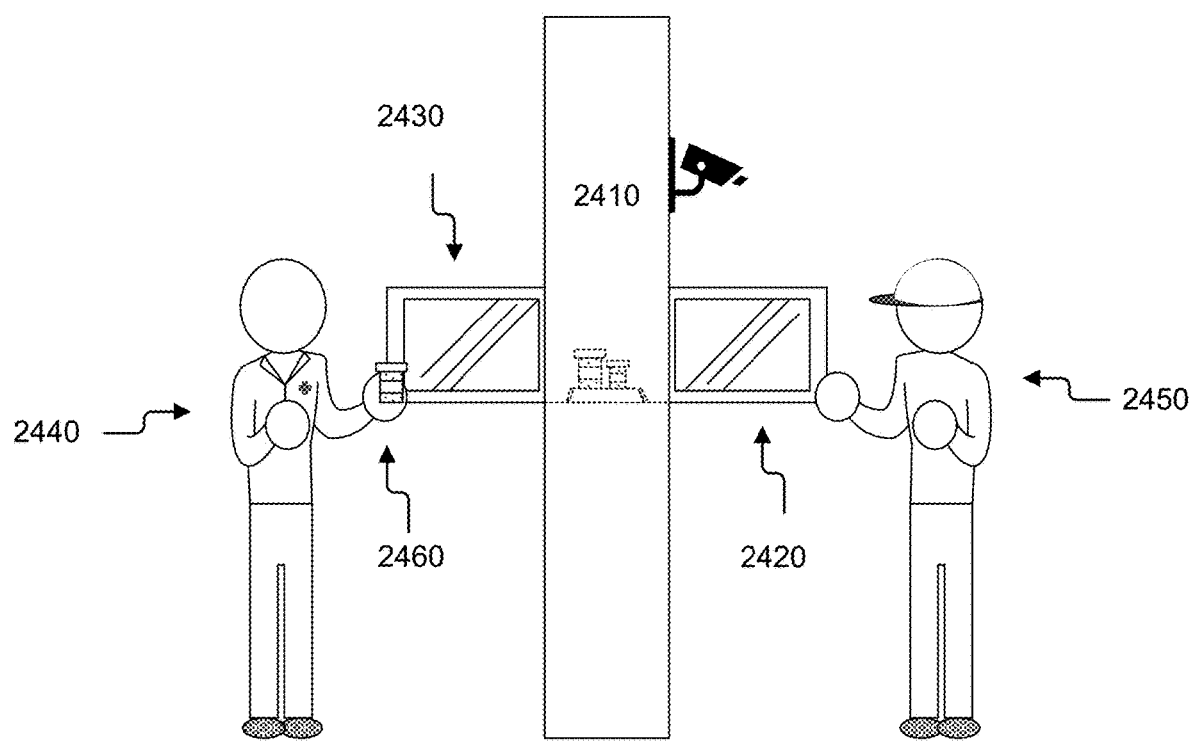
FIG. 24 illustrates an exemplary secure item retrieval device, according to some embodiments of the present disclosure.

Referring now to FIG. 24, an exemplary secure item retrieval device 2400 according to some embodiments of the present disclosure, is illustrated. In some embodiments, the secure item retrieval device 2400 may include a first at least one door 2430, and a second at least one door 2420. In some aspects, the first at least one door 2430 and the second at least one door 2420 are each alterable between a closed position and an open position. In some implementations, the first at least one door 2430 physically blocks access to the first at least one opening when in the closed position and the second at least one door 2420 physically blocks access to the second at least one opening when in the closed position, wherein the at least one receptacle comprises a substantially hollow interior portion configured to removably receive at least one item. In some aspects, the first at least one door 2430 and the second at least one door 2420 are each connected through a wall 2410. In some aspects, wall 2410 may divide a structure into two separate rooms, allowing provider 2440 to place item 2460 into the substantially hollow interior portion to facilitate transfer to recipient 2450. In some implementations, the use of wall 2410 to provide contactless transfer of item 2460 for provider 2440 and recipient 2460 may make secure item retrieval device 2400 more suitable for high end establishments, nursing home, retirement home, or assisted living facilities, or pharmacies, as non-limiting examples.

Figure 25:
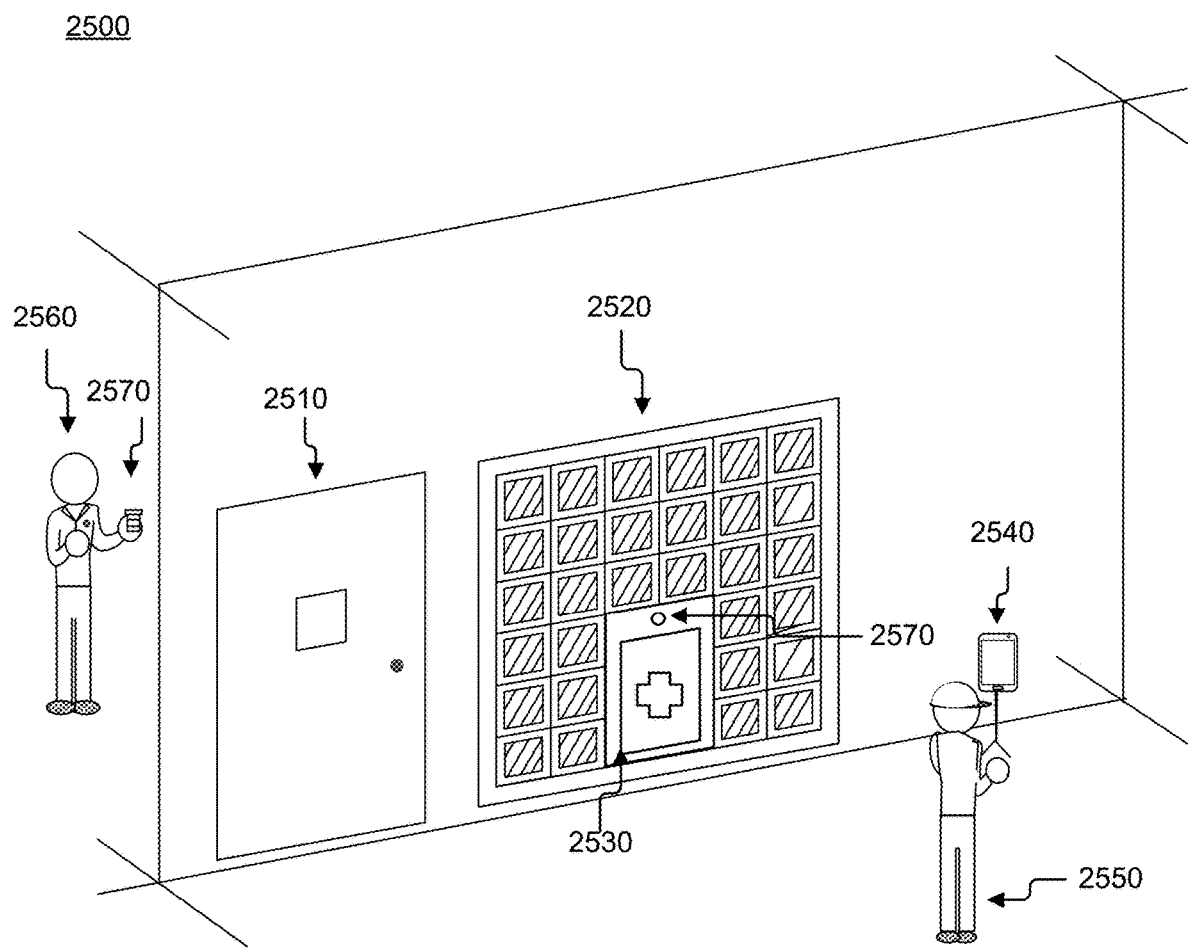
FIG. 25 illustrates an exemplary secure item retrieval device, according to some embodiments of the present disclosure.

Referring now to FIG. 25, an exemplary secure item retrieval device 2500 according to some embodiments of the present disclosure, is illustrated. In some embodiments, the receptacle 2520 may include at least one receptable, wherein a provider 2560 may transfer an item 2570 through the first at least one door to provide access through the second at least one door to a recipient 2550. In some aspects, the secure item retrieval device 2500 may include a computing device 2540 to transmit at least one signal to a separate computing device, wherein the provider 2550 may use a computing device 2540 to facilitate retrieval of item 2570. In some implementations, the computing device 2540 may be portable, wherein the computing device may be configured to function at different locations with the same or separate secure item retrieval device 2500.

In some aspects, the secure item retrieval device 2500 may include a door 2510, wherein the provider 2560 may access the other side of the secure item retrieval device 2500 to assist the recipient 2550 in using the computing device 2540, as a non-limiting example. In some embodiments, the computing device 2530 may make secure item retrieval device 2500 more suitable for high end establishments, nursing homes, retirement homes, assisted living facilities, or pharmacies, as non-limiting examples.

In some aspects, the portable computing device 2540 may be a phone, tablet, or other smart device, as non-limiting examples. In some implementations, the portable computing device 2540 may make secure item retrieval device 2500 more suitable for high end establishments, nursing homes, retirement homes, assisted living facilities, or pharmacies, as non-limiting examples. By way of example and not limitation, a recipient 2550 may interact with computing device 2540 or portable device 2540 to receive item from provider 2560 in a contactless manner. In some aspects, a receptacle 2530 may include a camera 2570 that may monitor recipient 2550 to ensure the item may be received by the correct recipient 2550. In some embodiments, the camera 2570 may make the secure item retrieval device 2500 more suitable for high end establishments, nursing homes, retirement homes, assisted living facilities, or pharmacies, as non-limiting examples.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desir-

What is claimed is:

1. A secure item retrieval device including:
at least one receptacle, wherein the at least one receptacle comprises a top portion, a bottom portion, at least one sidewall, a first at least one opening, a second at least one opening, a first at least one door, and a second at least one door, wherein the first at least one door and the second at least one door are each alterable between a closed position and an open position, wherein the first at least one door physically blocks access to the first at least one opening when in the closed position and the second at least one door physically blocks access to the second at least one opening when in the closed position, wherein the at least one receptacle comprises a substantially hollow interior portion configured to removably receive at least one item, wherein the substantially hollow interior portion is accessible through both the first at least one opening and the second at least one opening when assembled, wherein the secure item retrieval device is configured to allow transfer of an item through the first at least one door to provide access to the item through the second at least one door to a recipient, and wherein the first at least one door and the second at least one door are each connected to at least a portion of the secure item retrieval device by at least one attachment mechanism;
at least one controller;
a computing device that is communicatively coupled with the secure item retrieval device, wherein the computing device includes a software with a recipient identity verification, wherein the recipient identity verification is configured to authenticate at least one identification document based on its identifying information pertaining to a unique recipient; and
at least one locking mechanism, wherein the at least one locking mechanism is alterable between a locked state and an unlocked state, wherein the at least one locking mechanism is configured to maintain at least one of: the first at least one door and the second at least one door in the closed position when in the locked state, wherein the at least one controller is configured to alter the at least one locking mechanism from the locked state to the unlocked state when one or more predetermined conditions are satisfied, wherein the computing device is configured to send signals to the at least one controller, wherein the at least one controller requires authentication of the at least one identification document for the unique recipient before altering the at least one locking mechanism into its unlocked state.

2. The secure retrieval device of claim 1, wherein the substantially hollow interior portion of the receptacle includes a scale to weigh the at least one item.

3. The secure retrieval device of claim 1, wherein the at least one receptacle is insertable into a wall of a building.

4. The secure retrieval device of claim 1, wherein the first at least one door and the second at least one door are configured on opposing sides of the at least one receptacle, wherein the first at least one door and the second at least one door each comprises an interior surface proximate to the substantially hollow interior portion, wherein the interior surface of the first at least one door comprises a first at least one handle configured to allow a user to alter the first at least one door to the closed position by reaching through the second at least one opening.

5. The secure item retrieval device of claim 1, wherein the bottom portion of the at least one receptacle includes wheels.

6. The secure item retrieval device of claim 5, wherein the wheels may include at least one locking mechanism to alter the wheels between a locked state and an unlocked state.

7. The secure item retrieval device of claim 5, wherein the wheels may include at least one attachment mechanism to attach and detach the wheels to the secure item retrieval device.

8. The secure item retrieval device of claim 1, wherein the top portion and the bottom portion of the secure item retrieval device may include at least one securing mechanism, wherein at least one securing mechanism of the bottom portion may be couplable with at least one securing mechanism of the top portion of a separate secure item retrieval device to connect the at least two secure item retrieval devices.

9. The secure item retrieval device of claim 8, wherein the at least one securing mechanism may include a locking mechanism that may be configured to be altered between a locked and an unlocked state.

10. The secure item retrieval device of claim 8, wherein a plurality of receptacles may be connected to one another through the at least one securing mechanism.

11. The secure item retrieval device of claim 1, further including a handle positioned on a sidewall that does not include the first at least one opening or the second at least one opening, wherein the handles is positioned in at least one point on the sidewall.

12. The secure item retrieval device of claim 11, wherein the handles includes bands made of rope, chains, rubber, or metal that attach the handles to the secure item retrieval device.

13. The secure item retrieval device of claim 11, wherein the handles includes an attachment mechanism, wherein the handle is configured to be attached and detached from the secure item retrieval device.

14. The secure item retrieval device of claim 1, wherein the at least one receptacle includes the at least first door and the at least second door divided by a wall.

15. The secure item retrieval device of claim 14, wherein the wall divides a structure into two separate rooms to facilitate contactless transfer of at least one item.

16. The secure item retrieval device of claim 1, wherein the secure item retrieval device is connectable to the at least one computing device to transmit at least one signal to a separate computing device to facilitate the transfer of the at least one item in the at least one receptacle by opening and closing the at least one receptacle.

17. The secure item retrieval device of claim 16, wherein the at least one computing device is portable, wherein the computing device is configured to function at different locations with the same or a separate at least one secure item retrieval device.

18. The secure item retrieval device of claim 17, wherein the at least one portable computing device is a phone, tablet, or other smart device.

19. The secure retrieval device of claim 1, further including a camera on at least one door of the receptacle.

20. The secure retrieval device of claim 19, wherein the camera monitors whether an intended recipient is retrieving the at least one item placed in the substantially hollow interior portion.

* * * * *